United States Patent [19]
Seto et al.

[11] Patent Number: 5,905,632
[45] Date of Patent: May 18, 1999

[54] PORTABLE ELECTRONIC APPARATUS HAVING A BATTERY PACK RECEPTACLE

[75] Inventors: Masaru Seto; Hideaki Tanaka; Yasuyuki Horii; Naohiro Yokoyama; Atsushi Tatemichi, all of Tokyo, Japan

[73] Assignee: Kobushiki Kaisha Toshiba, Kawasaki, Japan

[21] Appl. No.: 08/968,924

[22] Filed: Nov. 6, 1997

Related U.S. Application Data

[63] Continuation of application No. 08/615,439, Mar. 14, 1996.

[30] Foreign Application Priority Data

Jun. 20, 1995 [JP] Japan .................................... 7-153369

[51] Int. Cl.$^6$ ............................... G06F 1/16; H01M 2/10
[52] U.S. Cl. ............................ 361/683; 429/97; 429/100
[58] Field of Search ..................................... 361/683–686, 361/724–727; 429/96–100, 123; 364/708.1; G06F 1/16

[56] References Cited

U.S. PATENT DOCUMENTS

| | | | |
|---|---|---|---|
| 4,870,604 | 9/1989 | Tatsuno | 364/708.1 |
| 5,130,892 | 7/1992 | Satou | 361/683 |
| 5,140,138 | 8/1992 | Tanaka . | |
| 5,155,659 | 10/1992 | Kunert | 361/683 |
| 5,187,643 | 2/1993 | I-Shou . | |
| 5,210,681 | 5/1993 | Hosoi et al. | 361/686 |
| 5,220,520 | 6/1993 | Kessoku . | |
| 5,225,293 | 7/1993 | Mitchell et al. | 429/97 |
| 5,251,105 | 10/1993 | Kobayashi et al. . | |
| 5,305,180 | 4/1994 | Mitchell et al. . | |
| 5,311,455 | 5/1994 | Ho . | |
| 5,325,262 | 6/1994 | Ma . | |
| 5,332,306 | 7/1994 | Babb et al. . | |
| 5,452,179 | 9/1995 | Sasaki . | |
| 5,455,746 | 10/1995 | Sato et al. . | |
| 5,515,237 | 5/1996 | Ogami et al. | 361/685 |
| 5,566,050 | 10/1996 | Seto et al. | 361/686 |

*Primary Examiner*—Lynn D. Feild
*Attorney, Agent, or Firm*—Limbach & Limbach LLP

[57] ABSTRACT

The portable electronic apparatus has a box-like casing having a peripheral wall, and a pack receptacle defined within the casing. The pack receptacle has an opening portion opened in the peripheral wall. A packaged functional component is stored in the pack receptacle, such that the functional component can be detached therefrom through the opening portion. The pack receptacle of the casing is provided with a locking member for holding the functional component. The locking member is movable by manual operation between a locked position where the locking member is hooked on the functional component and a lock-released position where the locking member leaves the functional component. The pack receptacle is provided with a spring for energizing the functional component in the direction in which the functional component is pushed out through the opening portion. The opening portion of the casing and the locking member are covered with a detachable cover.

10 Claims, 24 Drawing Sheets

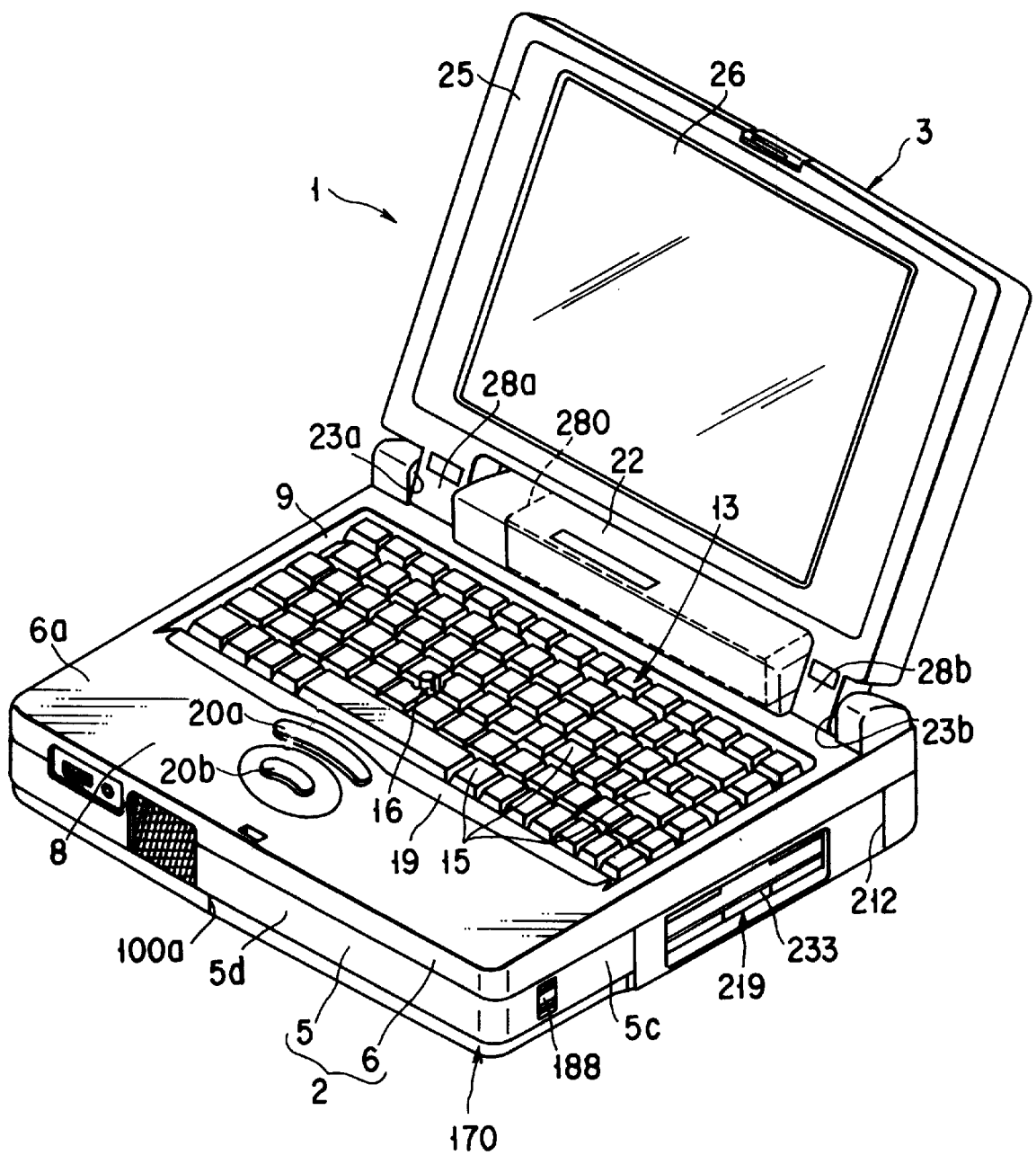
F I G. 1

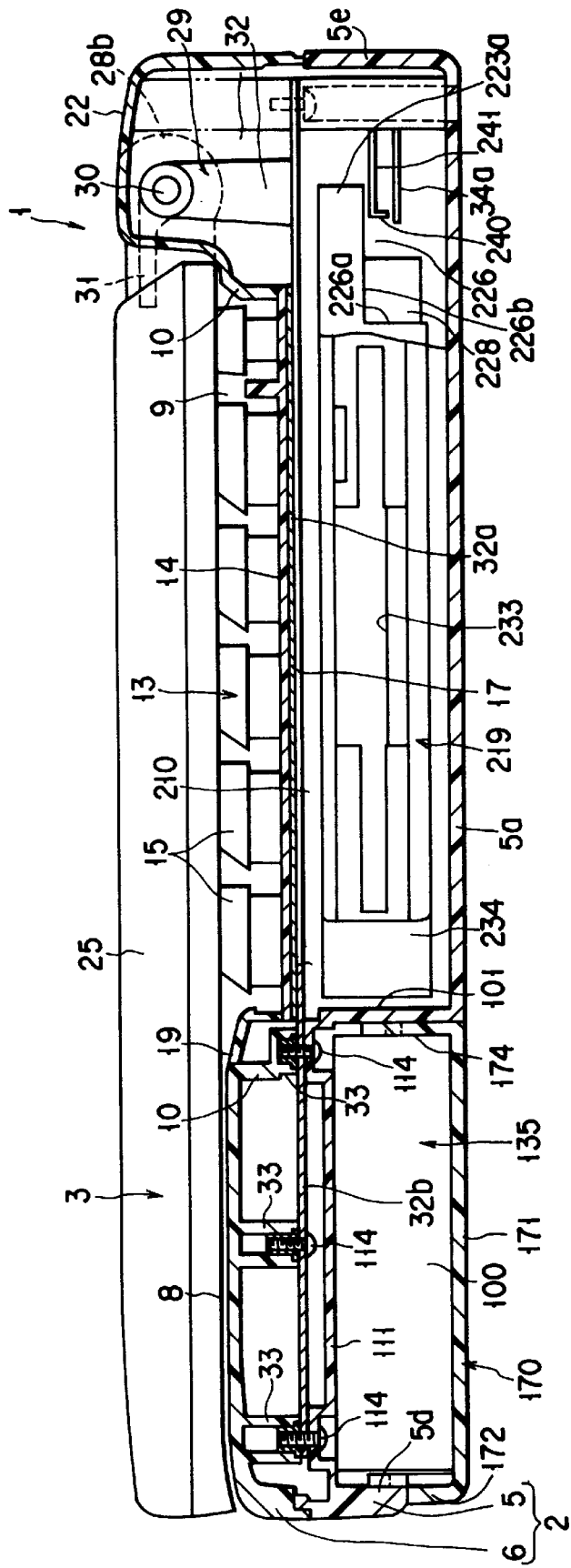
F I G. 3

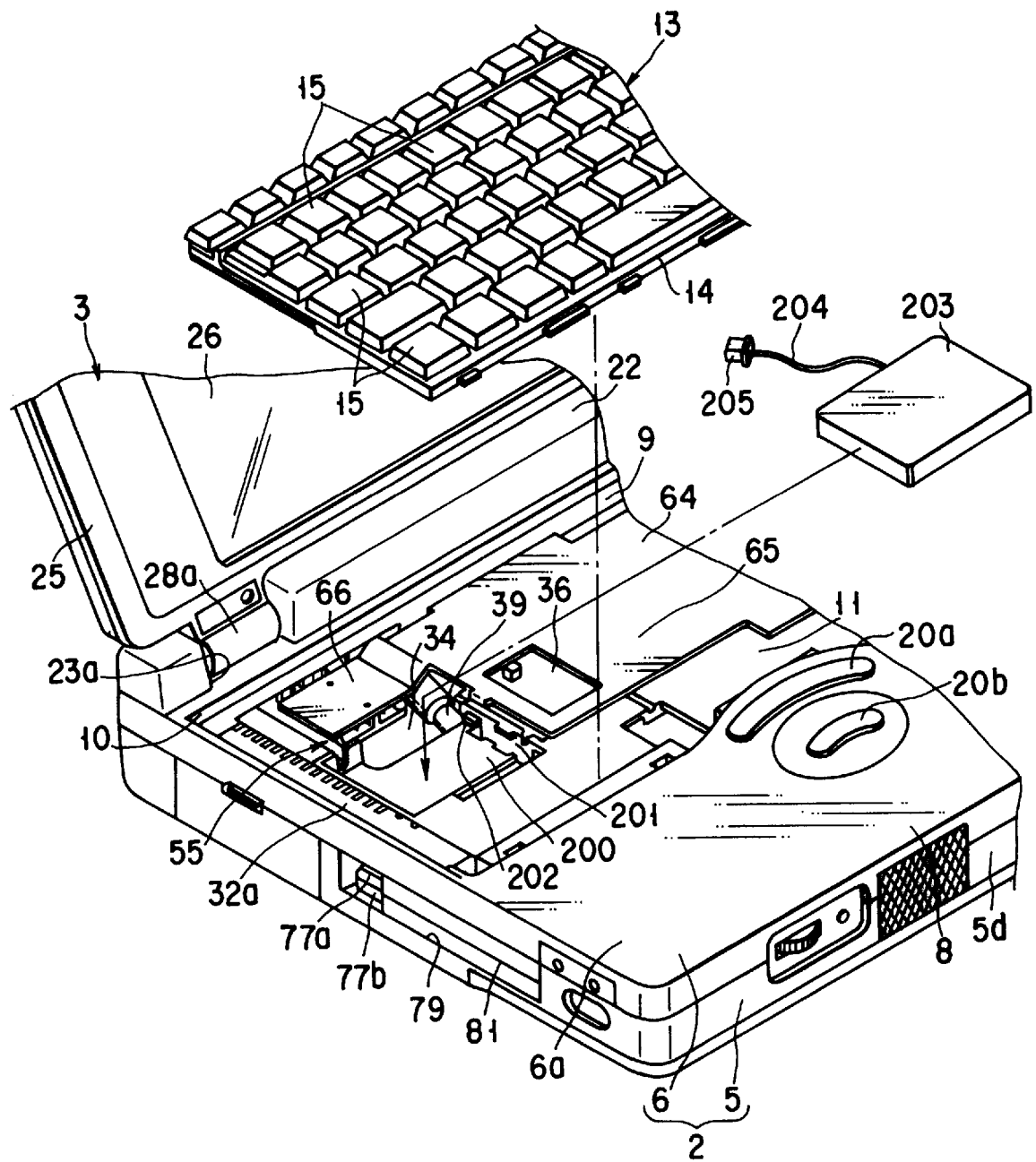
F I G. 4

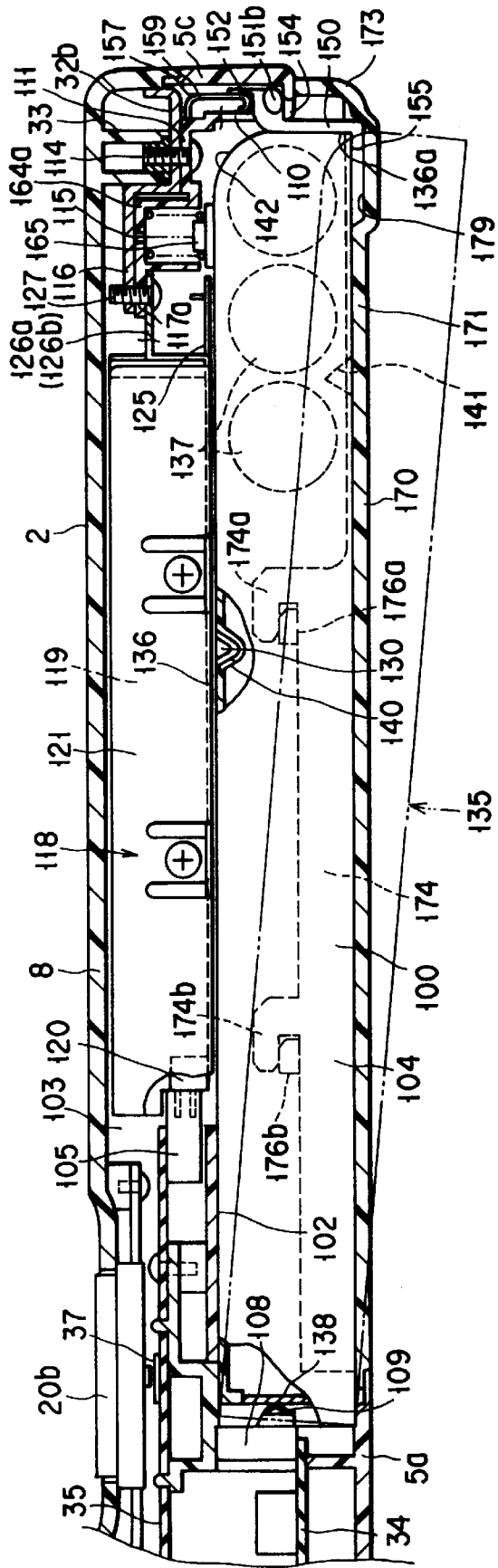
F I G. 10

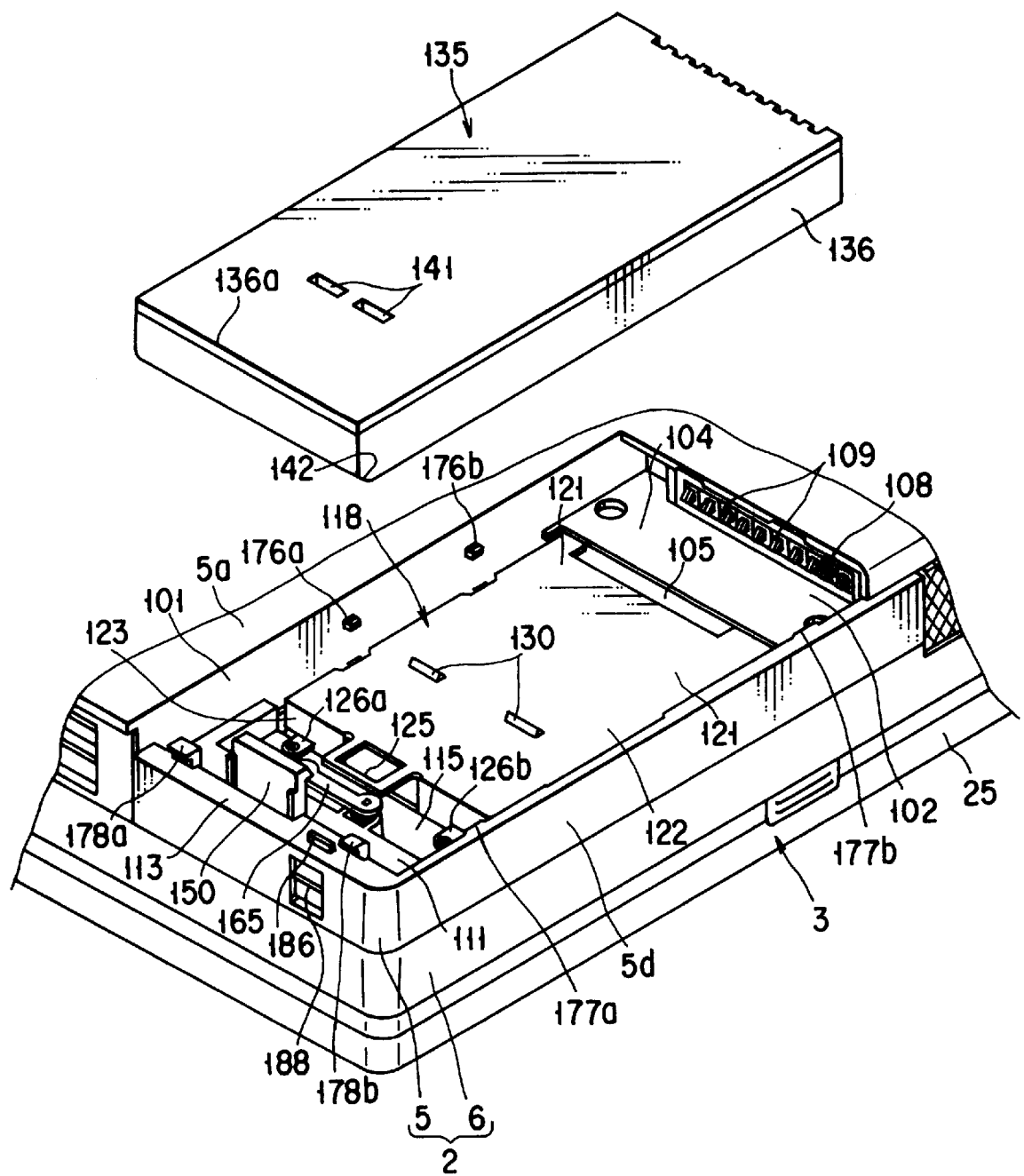
F I G. 12

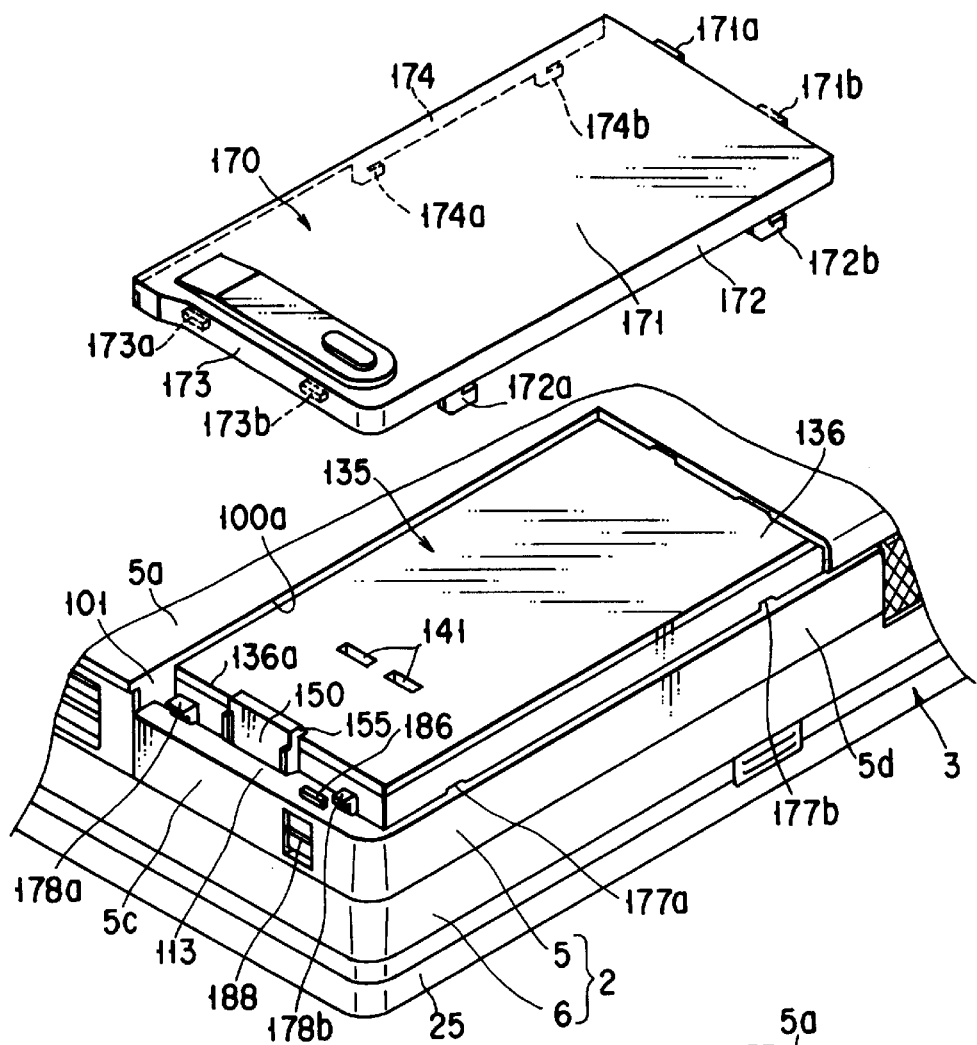
F I G. 13
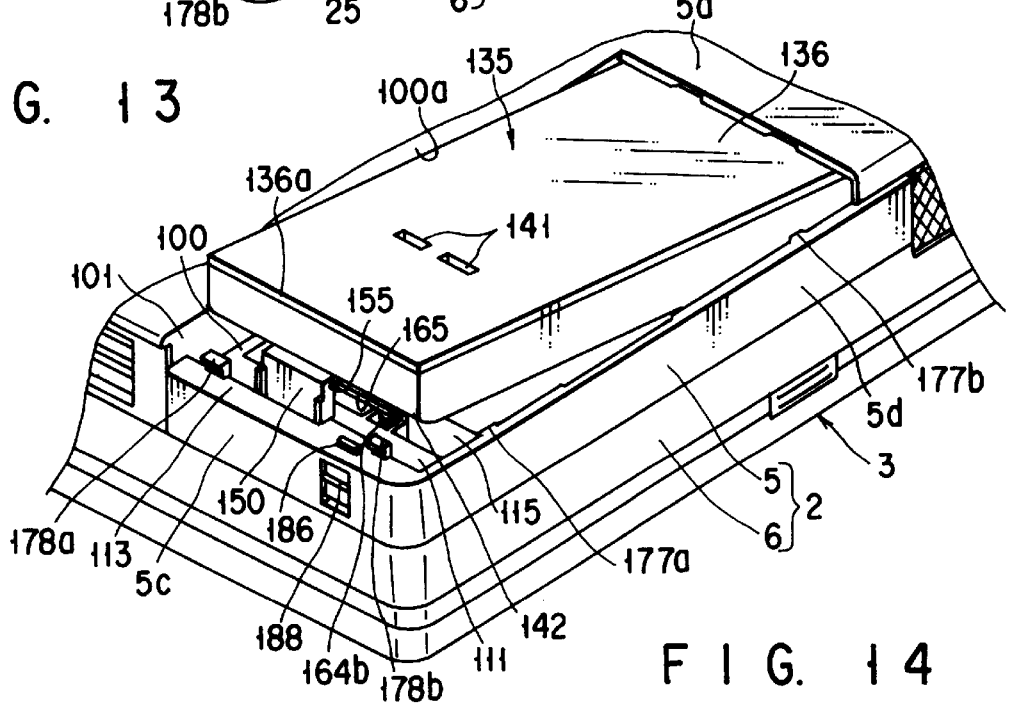
F I G. 14

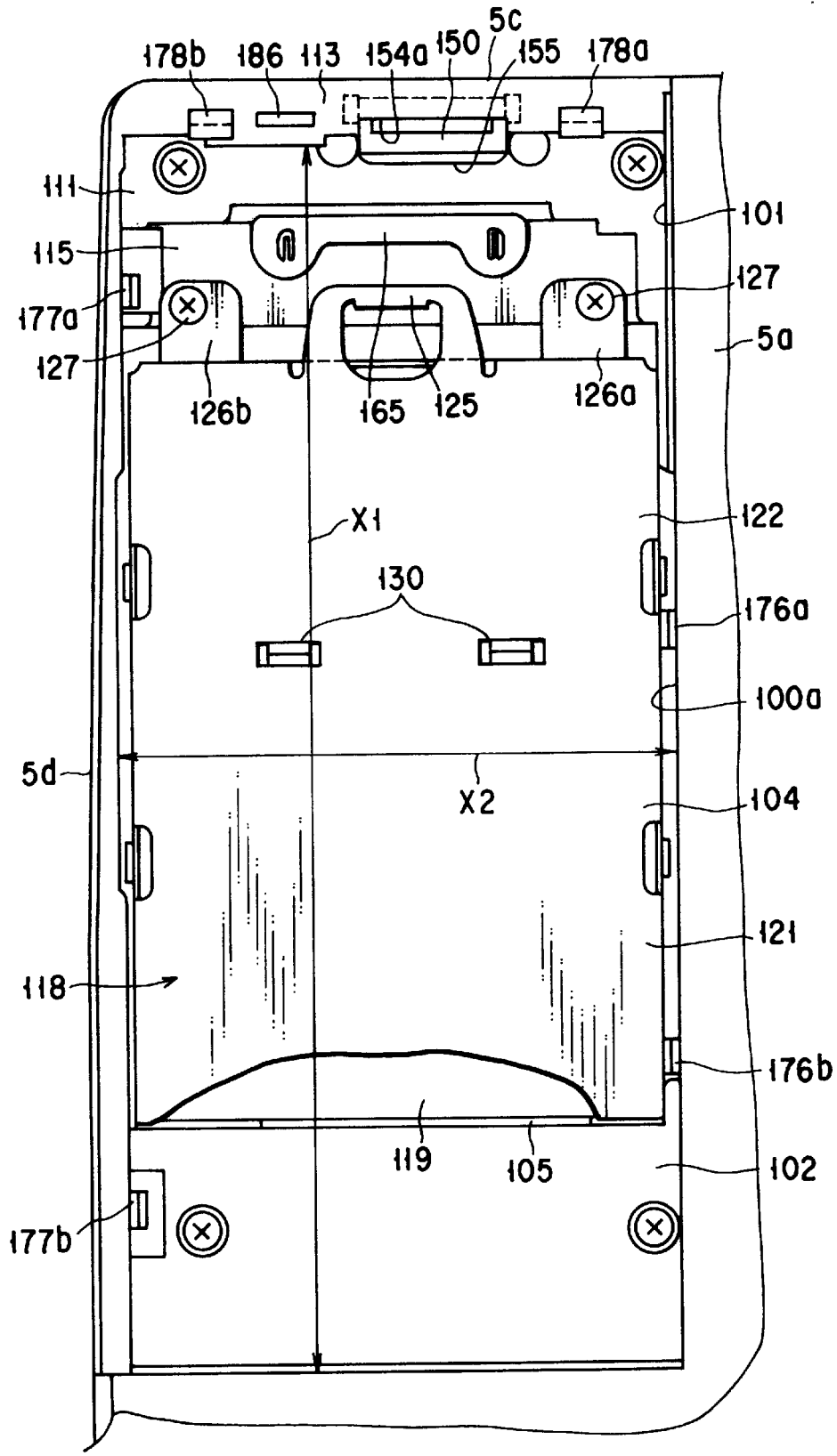
F I G. 17

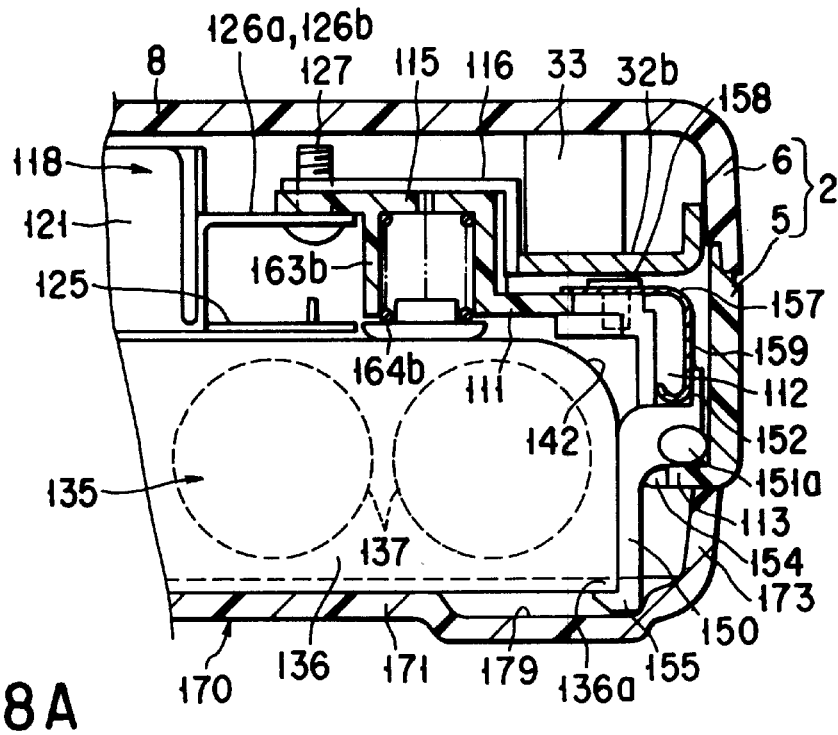
F I G. 18A
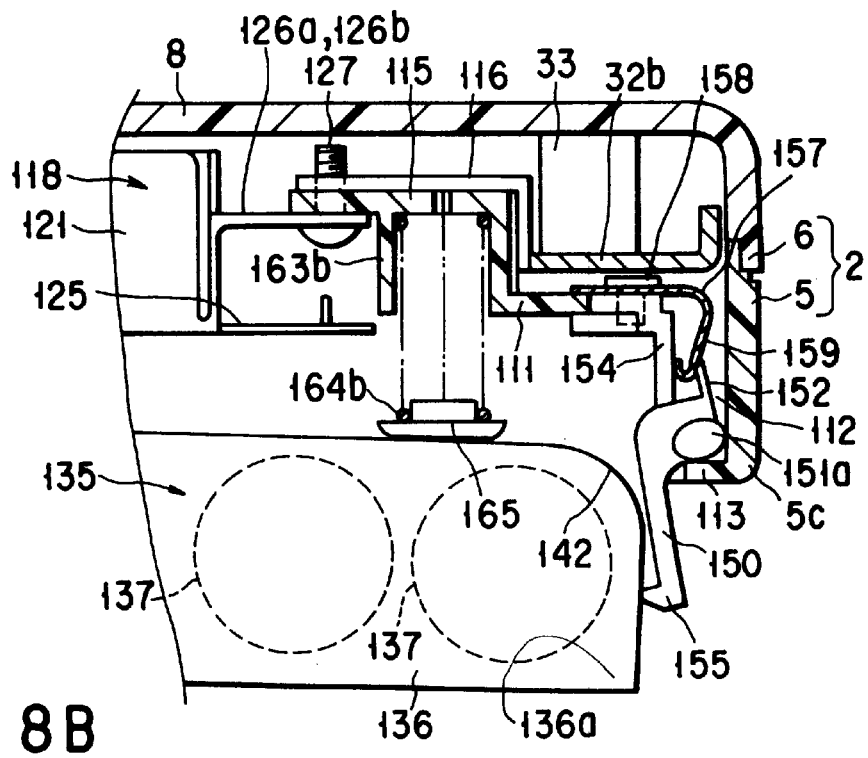
F I G. 18B

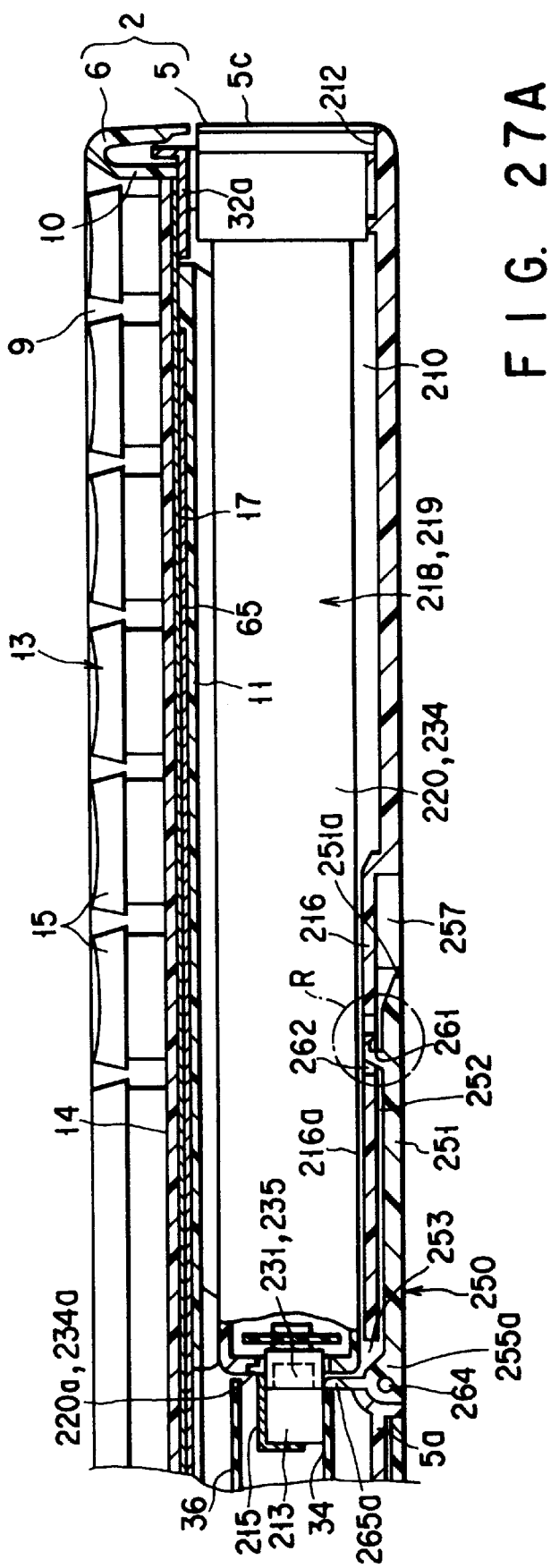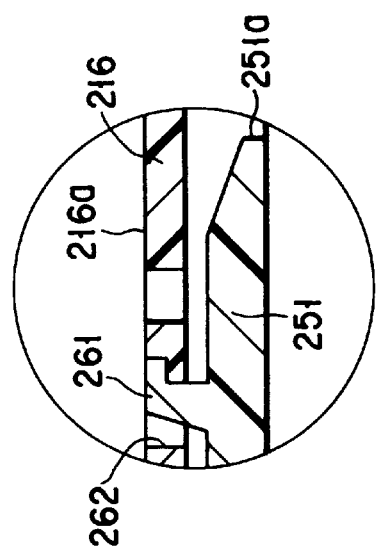
FIG. 27A
FIG. 27B

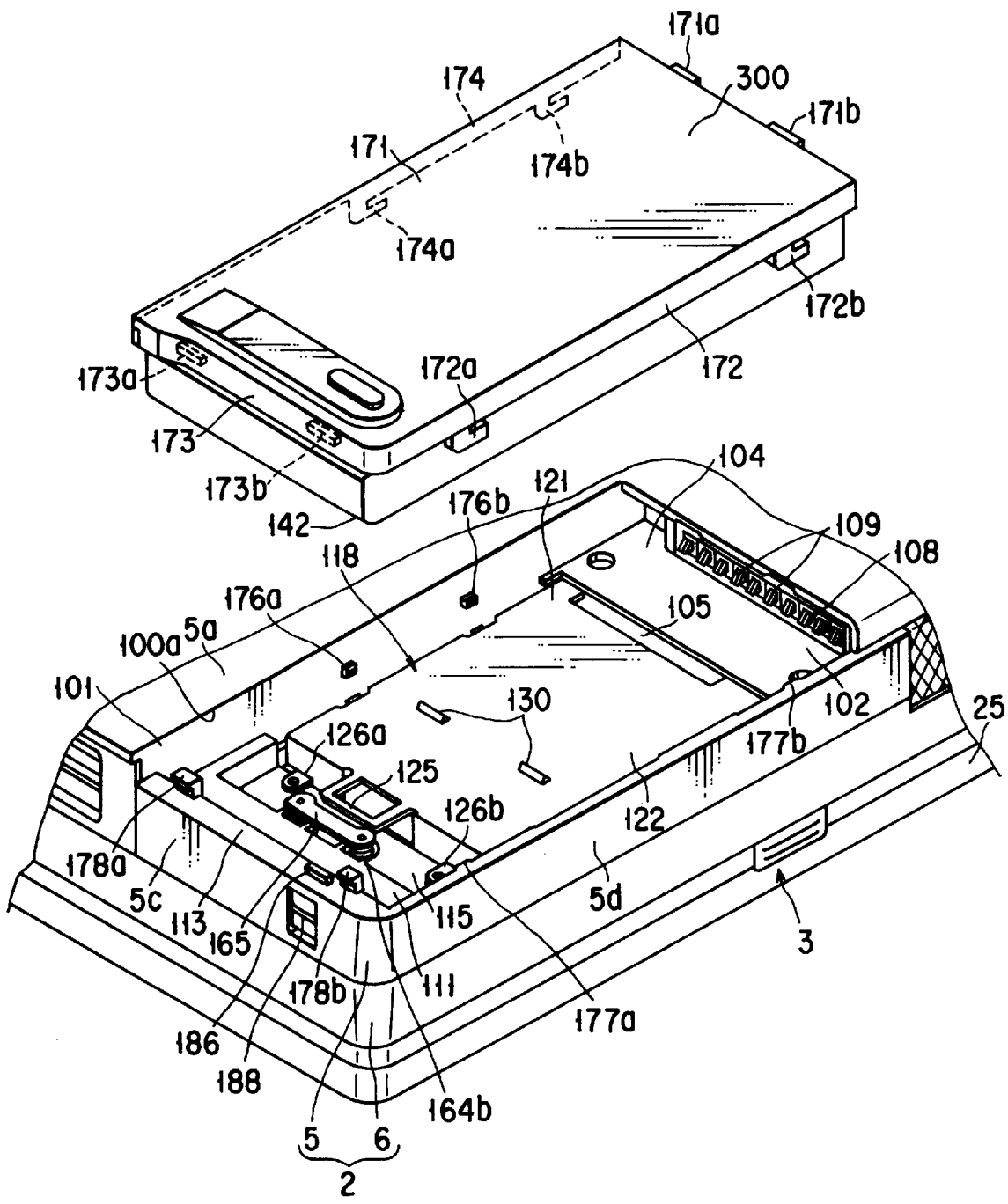
F I G. 30

PORTABLE ELECTRONIC APPARATUS HAVING A BATTERY PACK RECEPTACLE

This is a continuation of co-pending application Ser. No. 08/615,439 filed on Mar. 14, 1996.

BACKGROUND OF THE INVENTION

1. Field of the Invention

The present invention relates to a portable electronic apparatus such as a portable computer of book-type, and particularly, to a structure for allowing a battery pack or a CD-ROM drive device to be detachably contained in a casing of the electronic apparatus.

2. Description of the Related Art

In recent years, various portable computers have been provided which are easy to bring about and attain high functional performance. This kind of computers have a box-like casing with a keyboard. The casing internally contains various functional components such as a hard-disc drive device, a floppy disc drive device, and the likes.

This kind of computer comprises a battery pack which functions as a drive power source so that the it can be used where a commercial alternating current power source is not available. THe battery pack is detachably supported in the casing of the computer. This battery pack is detached from the casing at a relatively high frequency, in comparison with the functional components such as the hard-disc drive device and the floppy disc drive device. In this respect, there has been a know computer in which a battery receptacle for containing the battery pack is formed at a bottom portion of the casing. This battery receptacle is open in the bottom wall of the casing or in front and side walls continuously extending from the bottom wall, so that the battery pack can easily be attached there to or detached therefrom, without disassembling the casing.

However, in a computer whose battery receptacle is open in the bottom wall of the casing, a heavy and large battery pack is installed and pulled out through the bottom side of the casing. Therefore, when the battery pack is installed into and extracted from the battery receptacle, the battery pack cannot be supported by the casing, and may unintentionally fall therefrom. Then, the battery pack falls down on the ground or floor, causing such an impact which damages the battery pack.

As a manner of solving this problem, it has been considered that the casing is place up side down to make the bottom wall of the casing face upwardly, when the battery pack is pulled out of the battery receptacle. In this manner, since the battery receptacle is open upwardly, the heavy battery pack can be supported from the lower side by the casing, and the heavy battery pack can be prevented from falling unintentionally.

However, in this manner, when the battery pack is pulled out of the battery receptacle, it is necessary for a user to carry out a troublesome service that a user must hook his or her finger on the heavy battery pack and pull up the pack. Thus, detachment of the battery pack causes a difficulty.

On the other hand, down-sizing of the casing has been promoted with respect to a computer in recent days, in order to improve its portability. Therefore, a number of functional components including the battery pack, the hard-disc drive device, the floppy disc drive device, and the likes are arranged in the casing at a high density. These functional components are each packaged in modules each having a specialized function. Further, these functional components are detachably supported in the casing, so that they can be respectively replaced with components of higher abilities.

However, in several kinds of computers, a plurality of functional components must be layered on each other in the thickness direction, in view of the internal space of the casing. If the functional components are thus layered on each other, a plurality of opening portions for inserting and exerting the functional components must be formed in the bottom and side walls of the casing, and therefore, the shape of the casing is complicated. In addition, covers are required for respectively covering the opening portions of the casing, and the components of the casing are increased in number by the covers thus added. Therefore, manufacturing costs are increased, and as a result, the price of the computer is increased.

SUMMARY OF THE INVENTION

The present invention has a first object of providing a portable type electronic apparatus which prevents a functional component from unintentionally falling when a functional component such as a battery pack is detached from a casing, and which facilitates a service for pulling out the functional component.

The present invention has a second object of providing a portable type electronic apparatus in which first and second functional components arranged on each other can be inserted into and extracted from a pack receptacle through one single opening portion and which thus simplifies the structure of the casing.

In order to achieve the first object, the portable electronic apparatus according to the present invention comprises: a casing having a box-like shape and a peripheral wall; a pack receptacle defined within the casing, said pack receptacle having an opening portion open in the peripheral wall; a packaged functional component, stored in the pack receptacle such that the packaged functional component can be detached through the opening portion; locking means positioned in the pack receptacle, for holding the functional component in the pack receptacle, said locking means being movable by manual operation between a locked position where the locking means is hooked on the functional component and a lock-released position where the locking means leaves the functional component; pressure means provided in the pack receptacle, for energizing the functional component in a direction in which the functional component is pushed out of the opening portion; and a cover detachably supported on the casing, for covering the opening portion and the locking means.

In this structure, when the functional component is detached from the pack receptacle, the cover is detached from the casing, at first, thereby to expose the locking means and the opening portion. In this state, the functional component is still held in the casing by the locking means, and therefore, the functional component does not fall from the pack receptacle.

In the next, the locking means is operated to move from the locked position to the lock-released position, thereby to make the locking means leave the functional component. The locking of the functional component is thereby released. Since the functional component is pressed against the opening portion by the pressure means, and therefore, the functional component is pushed out of the opening portion when the locking of the functional component is released by the locking means. Therefore, even when the functional component is detached with the opening portion oriented upwardly, the functional component pushed out of the opening portion can be easily caught by hands. Accordingly, a complicated operation of pulling out the functional component with fingers hooked on the component is not necessary any more, and the functional component can be detached from the pack receptacle with improved operation ability.

In addition, since the locking means is provided in the pack receptacle, the functional component can be supported by the same hand as used for operating the locking means. Therefore, it is possible to prevent the functional component from unintentionally falling from the pack receptacle when the locking of the functional component is released, and thus, excellent operation ability is attained when the functional component is detached from the pack receptacle.

Further, since the cover hides the locking means, the locking means cannot be operated to move toward the lock-released position from the locked position as long as the cover is not detached. Therefore, it is possible to prevent the locking of the functional component from being unintentionally released.

In order to achieve the second object, the portable electronic apparatus according to the present invention comprises: a box-like casing including a horizontal peripheral wall having an opening portion; a pack receptacle defined within the casing and communicating with the opening portion; a packaged first functional component stored in the pack receptacle such that the first functional component can be detached through the opening portion; and a packaged second functional component stored in the pack receptacle, covering the first functional component in a direction from the opening portion, such that the second functional component can be detached through the opening portion, said first and second functional components are layered on each other in the thickness direction of the casing in the pack receptacle.

In this structure, since the first and second functional components are inserted and detached through one single opening portion, it is not necessary to form a plurality of opening portions which are respectively used for inserting and detaching a plurality of functional components. Therefore, the structure of the casing can be simplified.

In addition, the flat area occupied by two functional components is reduced to be smaller in comparison with a case where the first and second functional components are disposed in the width direction or the depth direction of the casing. Therefore, it is possible to save a space for storing other components, without enlarging the shape of the flat area of the casing.

Also in order to achieve the second object, the portable electronic apparatus according to the present invention comprises: a box-like casing including a horizontal peripheral wall having an opening portion; a pack receptacle defined within the casing and communicating with the opening portion; a packaged first functional component stored in the pack receptacle such that the first functional component can be detached through the opening portion; and a packaged second functional component stored in the pack receptacle and layered on the first functional component so as to cover the first functional component in a direction from the opening portion, such that the second functional component can be detached through the opening portion, said second functional component having a cover portion integrally formed, for covering the opening portion when the second functional component is stored in the pack receptacle, said cover portion continued to the peripheral wall of the casing.

In this structure, since the first and second functional components are inserted and detached through one single opening portion, it is not necessary to form a plurality of opening portions which are respectively used for inserting and detaching a plurality of functional components. Therefore, the structure of the casing can be simplified. Further, at the same time when the second functional component is stored in the pack receptacle, the opening portion is closed by the cover portion. Therefore, the opening portion cannot be left opened, and it is possible to prevent dust or the like from entering into the pack receptacle.

In addition, the flat area occupied by two functional components is reduced to be smaller in comparison with a case where the first and second functional components are disposed in the width direction or the depth direction of the casing. Therefore, it is possible to save a space for storing other components, without enlarging the shape of the flat area of the casing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 29 explain the first embodiment of the present invention.

FIG. 1 is a perspective view showing a portable computer.

FIG. 2 is a perspective view showing the portable computer placed with its bottom wall of a casing oriented upwardly.

FIG. 3 is a cross-section of the portable computer.

FIG. 4 is a perspective view showing the portable computer where a keyboard is detached from a keyboard mount portion.

FIG. 5 is a perspective view showing a position relationship between a heat sink and a heat-radiation plate.

FIG. 6 is a cross-section of the portable computer, showing the structure of a mount portion of the heat sink for cooling a TCP.

FIG. 7 is a perspective view of a card receptacle.

FIG. 8 is a perspective view where a first circuit board having the card receptacle and a card cover are detached from a lower housing.

FIG. 9 is a perspective view where the card cover is detached from the lower housing.

FIG. 10 is a cross-section of the portable computer where a battery pack and a hard-disc drive device are attached to a first pack receptacle of the casing.

FIG. 11 is a perspective view of the portable computer where the hard-disc drive device and the battery pack are detached from the first pack receptacle.

FIG. 12 is a perspective view of the portable computer where the battery pack is detached from the first pack receptacle of the casing, and the hard-disc drive device is exposed.

FIG. 13 is a perspective view of the portable computer where a cover is detached from the casing and the battery pack of the first pack receptacle is exposed.

FIG. 14 is a perspective view of the portable computer where the battery pack has jumped out of the first pack receptacle of the casing.

FIG. 15 is a perspective view of the portable computer, showing the part of a portion where a locking member and a pressure plate are installed.

FIG. 16 is a perspective view showing a relationship between the locking member, an engagement member, and a spring member pressing them, disassembled from each other.

FIG. 17 is a bottom view of the casing where the hard-disc drive device is contained in the first pack receptacle.

FIG. 18A is a cross-section of the portable computer where the battery pack is contained in the first pack receptacle of the casing.

FIG. 18B is a cross-section of the portable computer where the battery pack has jumped out from the first pack receptacle of the casing.

FIG. 20 is a cross-section of the portable computer where the battery cover is hooked on the casing.

FIG. 21 is a perspective view showing a second pack receptacle of the casing as well as a CD-ROM drive device and a floppy disc drive device which can be selectively detached to the second pack receptacle.

FIG. 22 is a perspective view of the CD-ROM drive device.

FIG. 23 is a perspective view of the floppy disc drive device.

FIG. 24 is a plan view showing the second pack receptacle where an operation lever of an ejector is locked.

FIG. 25 is a plan view showing the second pack receptacle where the locking of the operation lever of the ejector is released.

FIG. 27A is a cross-section of the portable computer where the operation lever of the ejector is rotated to a first position.

FIG. 27B is a cross-section enlarging and showing a portion R of FIG. 27A.

FIG. 30 is a perspective view of a portable computer where a battery pack is detached from the first pack receptacle of the casing, thereby exposing the hard-disc drive device, in the second embodiment.

DETAILED DESCRIPTION OF THE PREFERRED EMBODIMENTS

In the following, the first embodiment of the present invention will be explained with reference to FIGS. 1 to 29.

Figure 2:
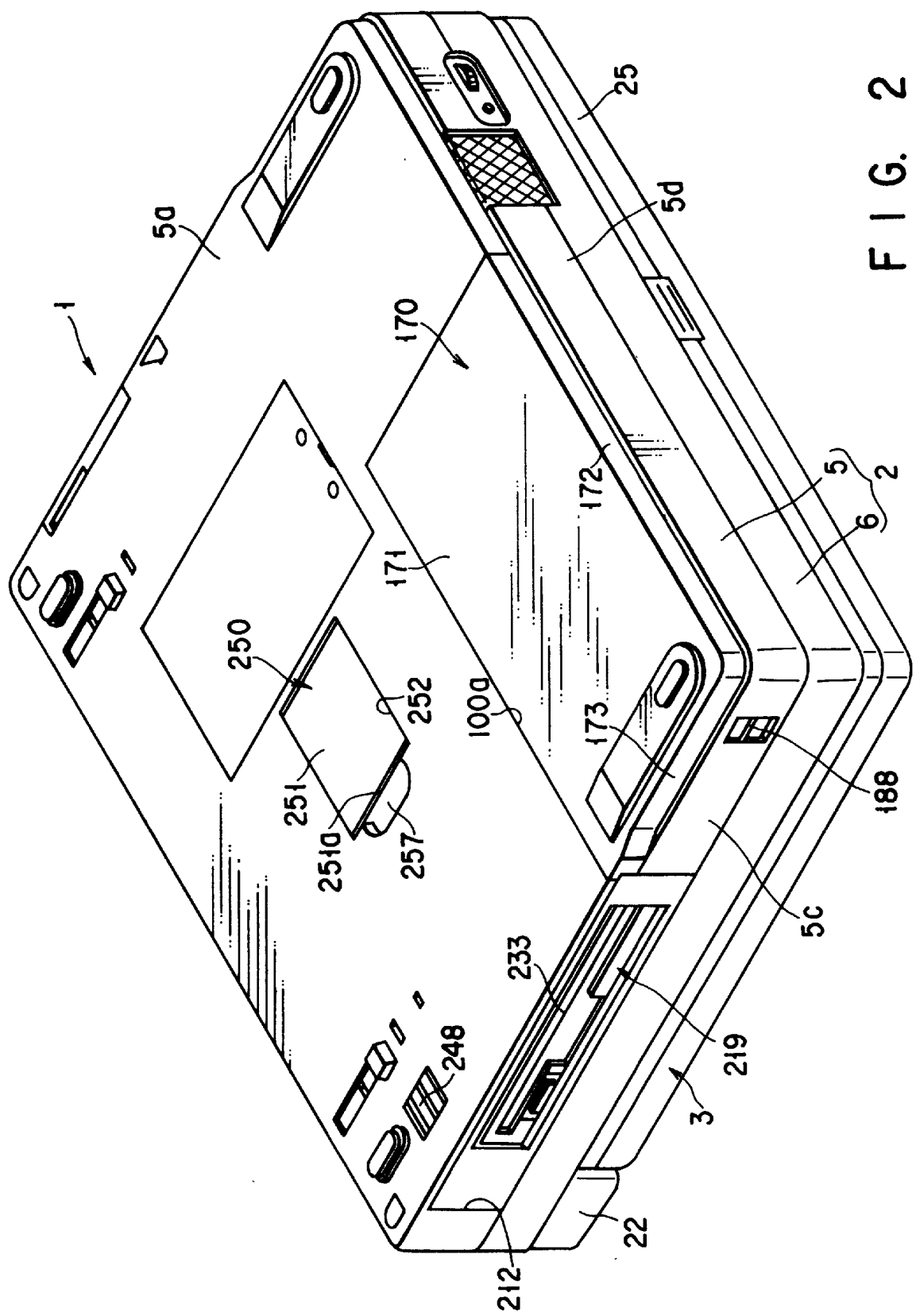

FIGS. 1 and 2 show a book type portable computer 1 of A4 size. This computer 1 comprises a flat box-like casing 2 and a display unit 3 supported on the casing 2. The casing 2 has a lower housing 5 and an upper housing 6 connected with the lower housing 5. These housings 5 and 6 are made of synthetic resin material such as ABS resin.

As shown in FIGS. 2 and 3, the lower housing 5 includes a flat bottom wall 5a, a pair of side walls 5b and 5c continuing to the bottom wall 5a, as well as a front wall 5d and a rear wall 5e. The side walls 5b and 5c as well as the front wall 5d and rear wall 5e extend upwardly from the peripheral portions of the bottom wall 5a.

The upper housing 6 has a substantially flat plate-like shape including an upper wall 6a. The peripheral portions of the upper wall 6a are connected to the side walls 5b and 5c and the front and rear walls 5d and 5e. The upper wall 6a of the upper housing 6 consists of front and rear halves. The front half of the upper wall 6a forms an arm rest 8. The rear half of the upper wall 6a is connected to the arm rest 8, and a keyboard mount portion 9 is formed on the rear half. The keyboard mount portion 9 is formed as a rectangular concave portion having size substantially covering the entire of the rear half.

Figure 5:
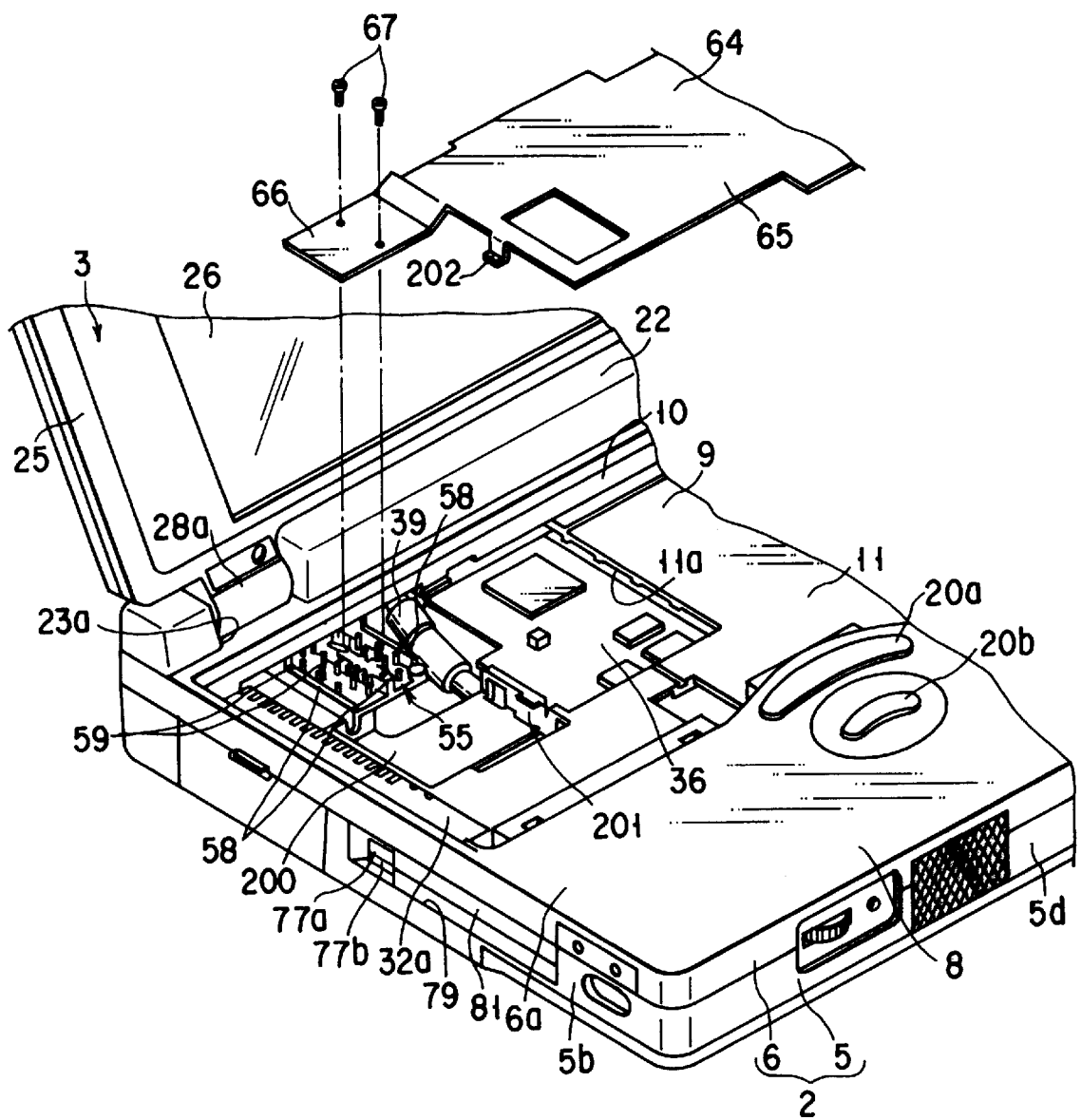

As shown in FIGS. 3 and 5, the keyboard mount portion 9 has a wall 10 extending downwardly from the upper wall 6a and a keyboard support wall 11 connected to the lower end portion of the wall 10. The keyboard support wall 11 is arranged substantially in parallel with the bottom wall 5a. A through-hole 11a communicating to the inside of the lower housing 5 is formed in the left half of the keyboard support wall 11.

A keyboard 13 is detachably mounted on the keyboard mount portion 9. The keyboard 13 comprises a keyboard panel 14 made of synthetic resin, a number of keys 15 disposed on the upper surface of the keyboard panel 14, and a joy-stick 16 as a kind of pointing device provided on the upper surface of the keyboard panel 14. The keyboard panel 14 has a rectangular plate-like shape of a size which can be engaged with the keyboard mount portion 9. The lower surface of the keyboard panel 14 is covered with a reinforcement plate 17 made of metal. The reinforcement plate 17 reinforces the keyboard panel 14, and prevents switching noise generated by operation of keys 15 from leaking into the inside of the casing 2. This reinforcement plate 17 is made of aluminum alloy which attains a high heat transmissions, and has a size large enough to cover the entire lower surface of the keyboard panel 14. The keyboard panel 14 has front and rear edge portions. These front and rear edge portions are detachably engaged with the wall 10 of the keyboard mount portion 9. In addition, the reinforcement plate 17 is layered over the upper surface of the keyboard support wall 11.

A keyboard holding panel 19 is detachably engaged in the keyboard mount portion 9. The keyboard holding panel 19 in cooperation with the front edge portion of the keyboard mount portion 9 presses the front edge portion of the keyboard panel 14, and the keyboard 13 is thereby held at the keyboard mount portion 9. The upper surface of the keyboard holding panel 19 is connected to the arm rest 8. A pair of click switch buttons 20a and 20b are arranged in the substantial center portion of the arm rest 8. The click switch buttons 20a and 20b are used for executing and canceling a command, and slightly project from the upper surface of the arm rest 8.

As shown in FIGS. 1 and 3, the upper wall 6a of the upper housing 6 has a hollow convex portion 22. The convex portion 22 extends in the width direction of the upper housing 6 immediately behind the keyboard mount portion 9. This convex portion 22 includes a pair of display support portions 23a and 23b. Each of the display support portions 23a and 23b is a concave portion continuously opened in the front, upper, and rear sides of the convex portion 22, and the display unit 3 is supported by the display support portions 23a and 23b.

The display unit 3 comprises a housing 25 and a color liquid crystal display 26 contained inside the housing 25. The housing 25 has a pair of leg portions 28a and 28b. These leg portions 28a and 28b are respectively inserted into the display support portions 23a and 23b, and are rotatably connected with the casing 2 through the hinge devices 29. FIG. 3 shows a connecting portion where a leg portion 28b is connected with the display support portion 23b. As is apparent from FIG. 3, the above hinge device 29 comprises a hinge shaft 30 extending horizontally, a first bracket 31 fixed at a first end of the hinge shaft 30, and a second bracket 32 rotatably connected with a second end of the hinge shaft 30.

The hinge shaft 30 penetrates between the display support portion 23b and the leg portion 28b. The first end of the hinge shaft 30 is inserted into the leg portion 28b, and the first bracket 31 of the first end is secured to the inner surface of the leg portion 28b by screws. The second end of the hinge shaft 30 is introduced into the convex portion 22, and the second bracket 32 of the second end is secured to the upper housing 6 and the lower housing 5 by screws. As shown in FIGS. 3 to 5, the second bracket 32 of the hinge device 29 has a support stay 32a extending in the depth direction of the upper housing 6. The support stay 32a is exposed toward the bottom of the keyboard mount portion 9, and the reinforcement plate 17 of the keyboard 13 is in contact with the upper surface of the support stay 32a.

As shown in FIG. 3, the support stay 32a of the right-hand side hinge device 29 has an elongated portion 32b extending to the right end portion of the arm rest 8. The elongated portion 32b faces the lower surface of the right end portion of the arm rest 8. A plurality of boss portions 33 for receiving the elongated portion 32b are provided on the lower surface of the arm rest 8.

Figure 6:
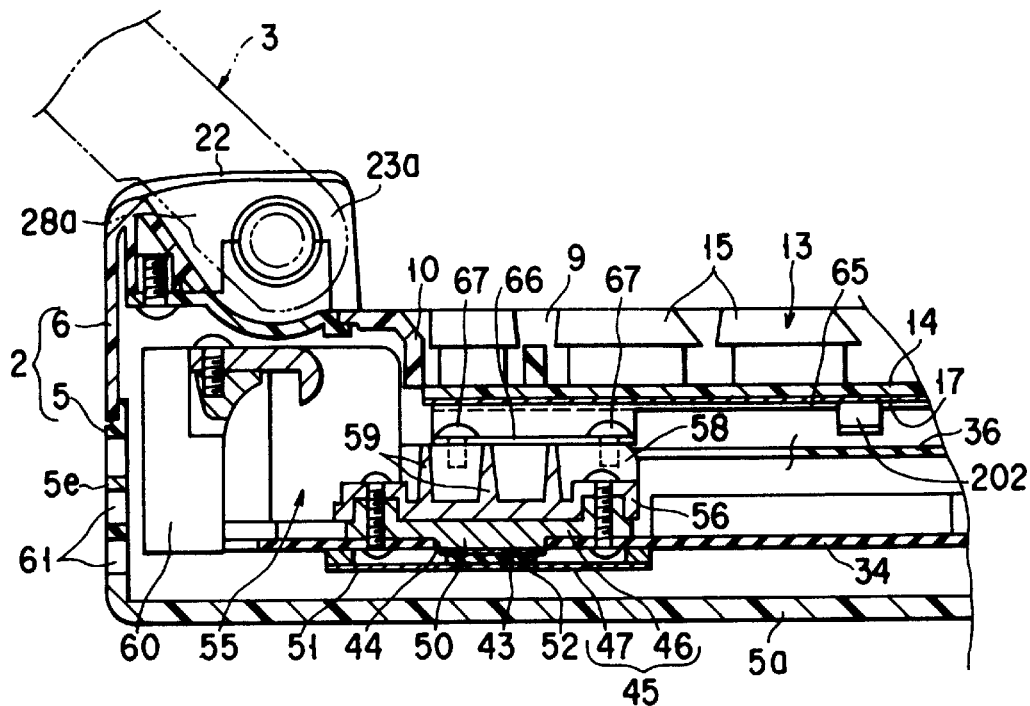
Figure 24:
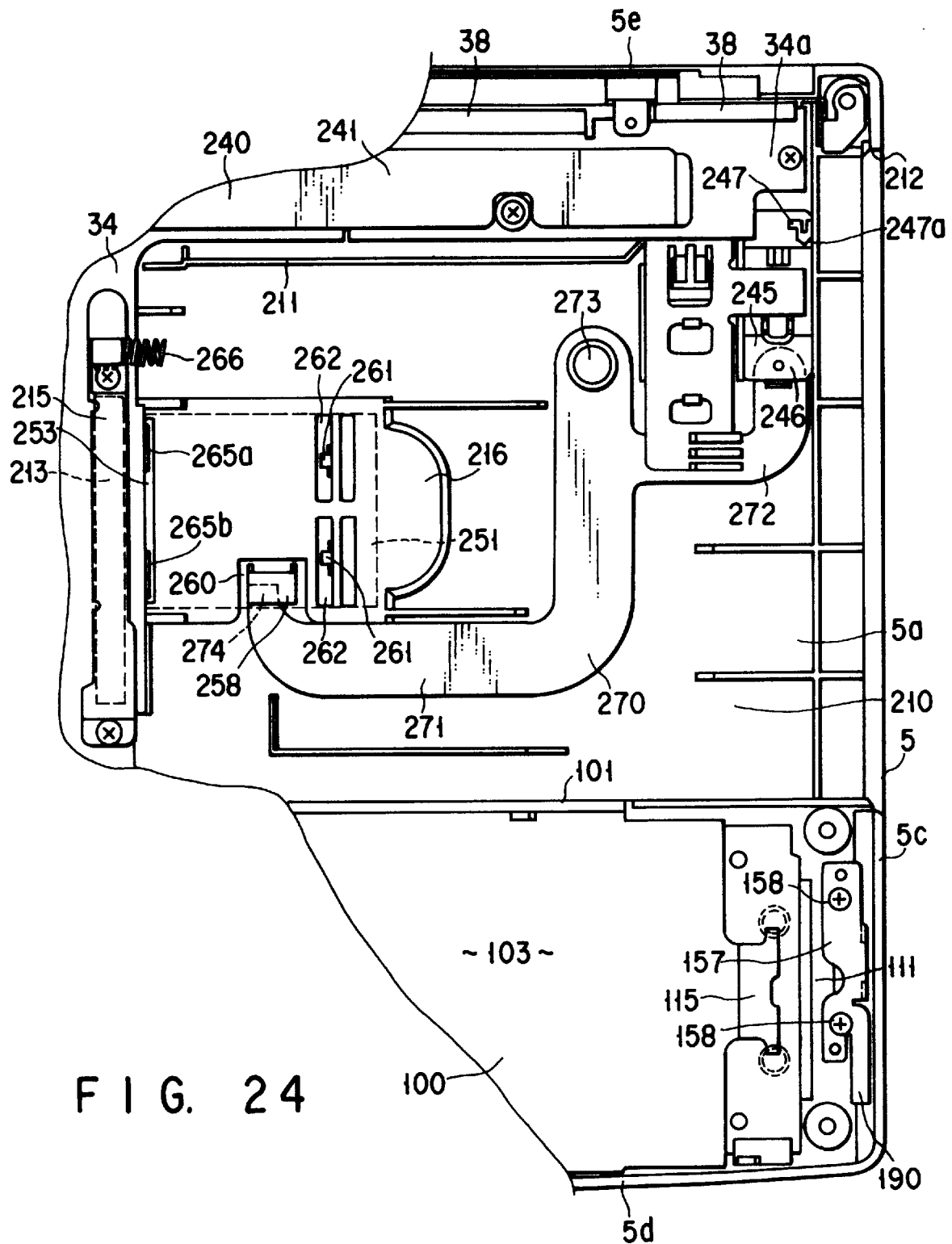

As shown in FIGS. 6 and 10, first to third circuit boards 34 to 36 are contained in the casing 2. The first circuit board 34 is a system board positioned in the left half of the lower housing 5. The first circuit board 34 is secured to the bottom wall 5a of the lower housing 5 by screws, in substantial parallel with the bottom wall 5a. As shown in FIG. 24, the first circuit board 34 has a connector support portion 34a. The connector support portion 34a extends along the rear wall 5e of the lower housing 5, in the rear end portion of the first circuit board 34. The connector support portion 34a is equipped with a plurality of connectors 38 for connection to a printer, an external floppy disc drive device, a CRT display, and the likes.

The second circuit board 35 is a sound board, and is arranged in substantial parallel with the first circuit board 34 above the front end portion of the first circuit board 34. THe second circuit board 35 is positioned below the arm rest 8. A pair of click switches 37 (one of which is shown) which are operated by the click switch buttons 20a and 20b are provided on the upper surface of the circuit board 35. The second circuit board 35 is electrically connected to the first circuit board 34 through a stacking connector.

The third circuit board 36 is a relay board, and is arranged below the keyboard mount portion 9, as shown in FIG. 5. A part of the third circuit board 36 faces the through-hole 11a of the keyboard mount portion 9. A cable 39 communicating with the liquid crystal display 26 described above is connected to the third circuit board 36. In addition, the third circuit board 36 is electrically connected to the first circuit board 34 through a stacking connector.

As shown in FIG. 6, a TCP (tape carrier package) 43 is installed on the lower surface of the first circuit board 34. The TCP 43 exhibits a very high calorific value during operation, due to its high speed processing and large capacity achieved in response to demands for variations of functions. The first circuit board 34 has a hole 44 of a square shape facing the IC chip (not shown) of the TCP 43.

The first circuit board 34 is equipped with a heat radiation unit 45 which receives heats from the TCP 43. The heat radiation unit 45 has a heat conductive member 46 and a cover 47. The heat conductive member 46 is made of metal material which has an excellent heat conductivity such as brass or aluminum alloy, for example. The heat conductive member 46 is secured to the upper surface of the first circuit board 34 by screws. The heat conductive member 46 has a heat receiving portion 50 which is engaged in the hole 44. The lower surface of the heat receiving portion 50 is stuck on the TCP 43. The cover 47 is arranged on the lower surface of the first circuit board 34. This cover 47 covers the TCP 43 in the lower side of the first circuit board 34. The cover 47 has a cover panel 51 made of metal. This cover panel 51 is in contact with the TCP 43 through an elastic sheet 52 having a heat conductivity. Therefore, when the TCP 43 generates a heat, the heat is transferred so as to escape through the heat conductive member 46 and the cover 47.

A heat sink 55 is provided on the upper surface of the heat conductive member 46. The heat sink 55 comprises a heat radiation panel 56. The heat radiation panel 56 is made of metal material having an excellent heat conductivity, such as aluminum alloy or magnesium alloy, for example, and is secured to the heat conductive member 46 by screws. As shown in FIGS. 5 and 6, a plurality of baffle plates 58 extending in the depth direction of the casing 2 and a number of heat radiation projections 59 are provided on the upper surface of the heat radiation panel 56.

An electric fan 60 is equipped at the rear end of the heat radiation panel 56. The electric fan 60 serves to forcibly cooling the heat radiation panel 56, and is driven when the temperature of the TCP 43 reaches a predetermined value. This electric fan 60 is provided adjacent to the rear wall 5e of the lower housing 5. An exhaust port 61 facing the electric fan 60 is provided in the rear wall 5e. Therefore, when the electric fan 60 is driven, air inside the casing 2 flows around the heat radiation projections 59 in the direction toward the electric fan 60. This air flow forcibly cools, as cooling air, the heat conductive member 46 and the heat radiation panel 56, and is exhausted out of the casing 2 through the exhaust port 61. As a result of this, the heat conductive member 46 and the heat radiation panel 56 are efficiently cooled, so that the heat radiation ability of the TCP 43 is thus raised.

As shown in FIG. 5, the heat sink 55 is positioned below the left end portion of the keyboard mount portion 9. The heat sink 55 faces the through-hole 11a of the keyboard support wall 11. This heat sink 55 is equipped with a heat radiation plate 64. The heat radiation plate 64 is made of metal material which has an excellent heat conductivity, such as aluminum alloy, for example. This heat radiation plate 64 includes a plate body 65 of a flat shape and a connecting part 66 which is continuously connected to the plate body 65. The plate body 65 has a size substantially large enough to cover the right half of the keyboard support wall 11, and is layered on the upper surface of the keyboard support wall 11. Therefore, the plate body 65 is in contact with the lower surface of the reinforcement plate 17 of the keyboard 13.

The connecting part 66 faces the heat sink 55 through the through hole 11a of the keyboard support wall 11. This connecting part 66 is secured to upper end portions of the baffle walls 58 by screws 67. Therefore, a part of a heat transferred to the heat sink 55 from the TCP 43 escapes to the plate body 65, through the connecting part 66, and further escapes from the plate body 65 to the reinforcement plate 17.

Figure 7:
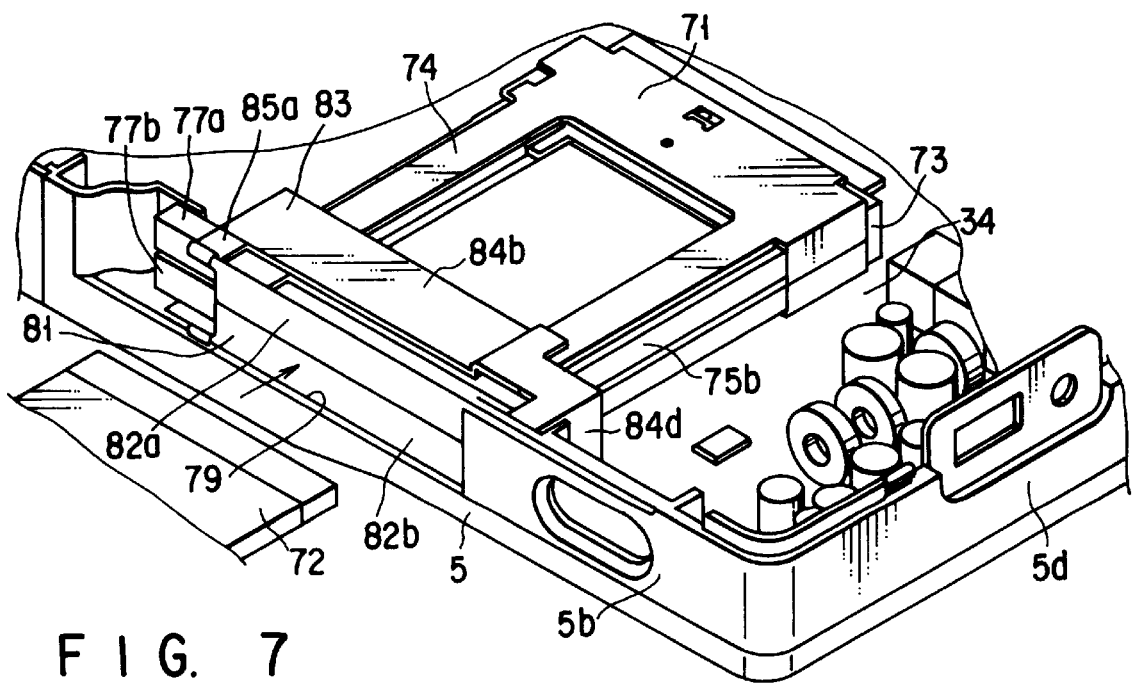
Figures 8, 9:
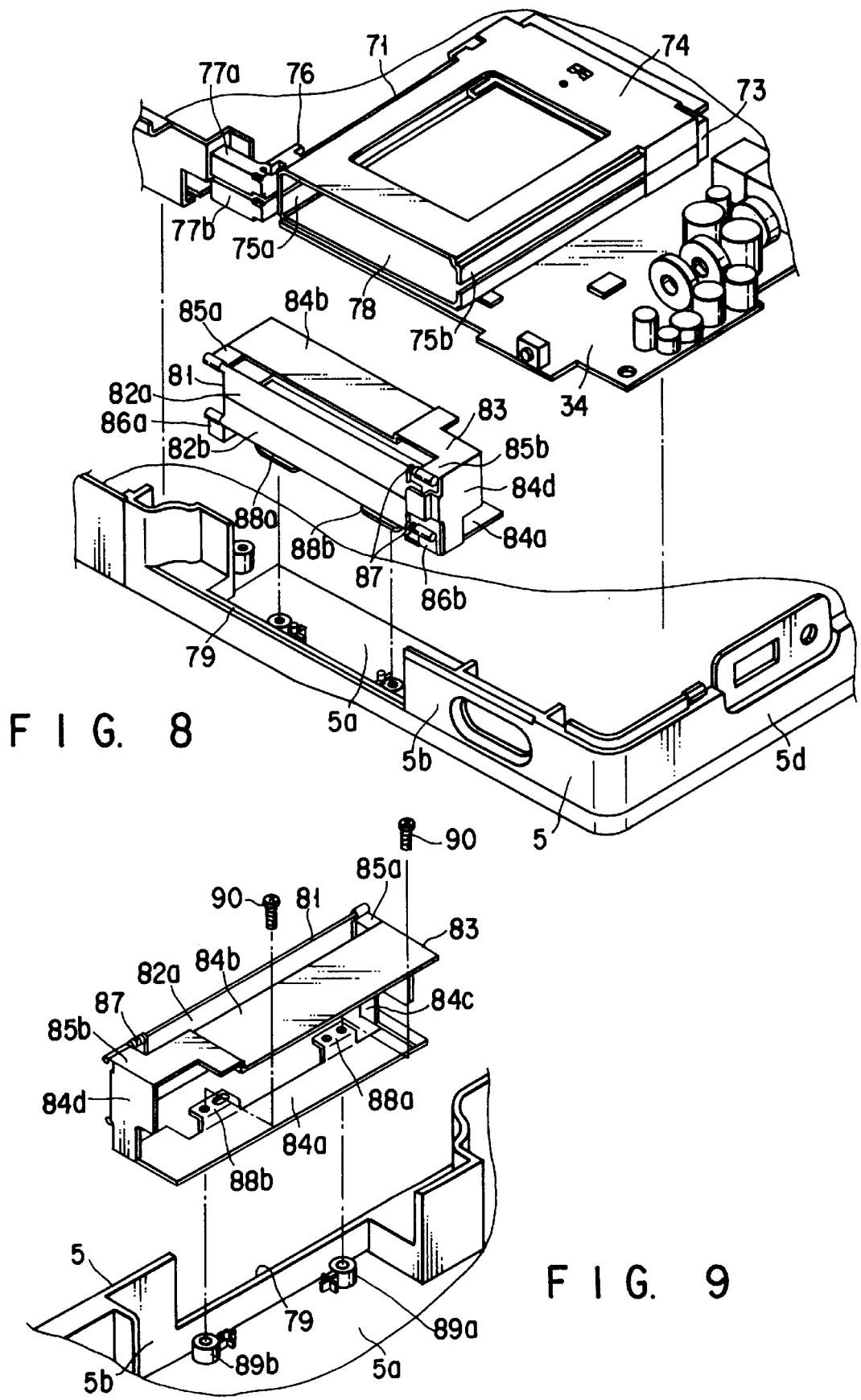

As shown in FIGS. 7 and 8, a card receptacle 71 is provided in the casing 2. The card receptacle 71 is used for detachably containing an expansion card 72 such as a PCMCIA (personal computer memory card international association) card or an interface card. This card receptacle 71 is positioned below the left end portion of the arm rest 8. The card receptacle 71 comprises a card connector 73 to be connected with the expansion card 72, and a case 74 made of metal material, continued to the card connector 73. The card connector 73 and case 74 are supported on the upper surface of the first circuit board 34. The case 74 has a hollow box-like shape. This case 74 comprises a pair of guide walls 75a and 75b for guiding the expansion card 72 to the card connector 73, and an ejector 76 for ejecting the expansion card 72. The ejector 76 has a pair of operation levers 77a and 77b which are operated by an operator. The operation levers 77a and 77b are slidably supported on one of the guide wall 75a, and are layered thereon in the height direction of the guide wall 75a.

As shown in FIG. 8, the case 74 has a card inlet port 78 facing the card connector 73. The card inlet port 78 is provided adjacent to the side wall 5b in the left side of the lower housing 5. A card insertion port 79 is open in the side wall 5b. The card insertion port 79 faces the card inlet port 78, and operation levers 77a and 77b of the ejector 76 are positioned at an end portion of the card insertion port 79.

The card receptacle 71 comprises a card cover 81 for opening and closing the card insertion port 79. The card cover 81 comprises first and second cover parts 82a and 82b both made of synthetic resin, as well as a bracket 83 for supporting the cover parts 82a and 82b made of metal. Each of the first and second cover parts 82a and 82b has an elongated rectangular shapes extending the depth direction of the lower housing 5. The bracket 83 has lower and upper walls 84a and 84b facing each other, as well as a pair of side walls 84c and 84d for connecting the lower and upper walls 84a and 84b. These walls 84a to 84d surround the card inlet port 78 of the card cover 81.

The lower and upper walls 84a and 84b respectively have a pair of support parts 85a and 85b and a pair of support parts 86a and 86b. The support parts 85a and 85b rotatably support the first cover part 82a. The support parts 86a and 86b rotatably support the second cover part 82b. The first and second cover parts 82a and 82b are always respectively rotated in the direction in which the card insertion port 79 is closed, by coil springs 87. Therefore, the first and second cover parts 82a and 82b are held by the bracket 83 such that the cover parts 82a and 82b are continuously extending on one single plane.

As shown in FIG. 9, the lower wall 84a of the bracket 83 is layered on the bottom wall 5a of the lower housing 5. The lower wall 84a has a pair of fixing parts 88a and 88b. In addition, the bottom wall 5a of the lower housing 5 has a pair of boss portions 89a and 89b. The boss portions 89a and 89b are positioned at end portions continued to the card insertion port 79, and the fixing parts 88a and 88b are fixed to the upper surfaces of the boss portions 89a and 89b, by screws 90. Therefore, the card cover 81 is supported on the lower housing 5 through the bracket 83, and the first and second cover parts 82a and 82b which can be opened and closed cover the card insertion port 79.

Figure 11:
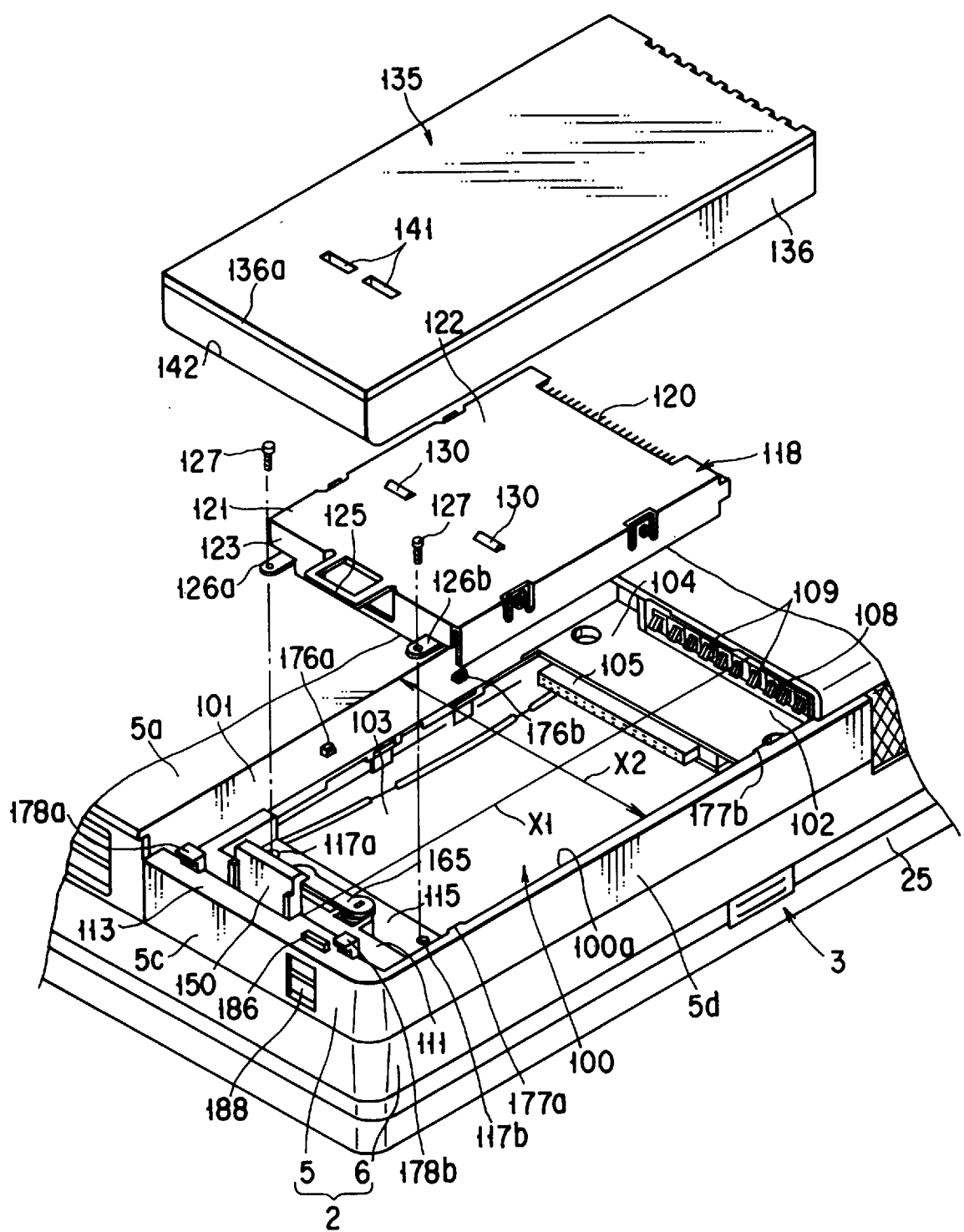

As shown in FIGS. 3 and 10, the casing 2 has a first pack receptacle 100. This first pack receptacle 100 is positioned below the arm rest 8. The first pack receptacle 100 has an opening portion 100a open in the bottom wall 5a of the lower housing 5, as shown in FIG. 11. The opening portion 100a faces the arm rest 8, and the inner surface of the arm rest 8 also serves as a ceiling of the first pack receptacle 100. The opening portion 100a of the first pack receptacle 100 has a rectangular shape including a long axis X1 extending in the width direction of the casing 2 and a short axis X2 extending in the depth direction of the casing 2.

The first pack receptacle 100 has a stand wall 101 extending upwardly from the bottom wall 5a of the lower housing 5, and a board support wall 102 communicating with the upper end of the stand wall 101. The stand wall 101 extends along the width direction of the lower hosing 5, and serves as a partition between the first pack receptacle 100 and the inside of the casing 2. The board support wall 102 is positioned below the arm rest 8 in the left end portion of the first pack receptacle 100. This board support wall 102 is provided in substantial parallel with the arm rest 8.

As shown in FIG. 10, the first pack receptacle 100 has a hard-disc container room 103 as a first section and a battery container room 104 as a second section. The hard-disc container room 103 and the battery container room 104 are disposed to be adjacent to each other in the height direction of the casing 2. The hard-disc container room 103 is positioned above the board support wall 102. The battery container room 104 is positioned below the board support wall 102. The hard-disc container room 103 is shorter in the width direction of the casing 2, by the size of the board support wall 102, than the battery container room 104. Therefore, the hard-disc container room 103 has an area smaller than the battery container room 104. This hard-disc container room 103 communicates with the opening portion 100a of the bottom wall 5a through the battery container room 104.

As shown in FIG. 10, the right end portion of the second circuit board 35 is secured to the upper surface of the board support wall 102 by screws. The right end portion of the second circuit board 35 faces the hard-disc container room 103. A hard-disc connector 105 is provided on the lower surface of the right end portion of the circuit board 35. This hard-disc connector 105 is exposed to the hard-disc container room 103.

As shown in FIGS. 10 and 11, a battery connector 108 is provided at the left end portion of the battery container room 104. The battery connector 108 is supported on the upper surface of the first circuit board 34. The battery connector 108 has a plurality of connection terminals 109. These connection terminals 109 are exposed to the battery container room 104, and are elastically energized in the direction extending toward the battery container room 104.

Figure 15:
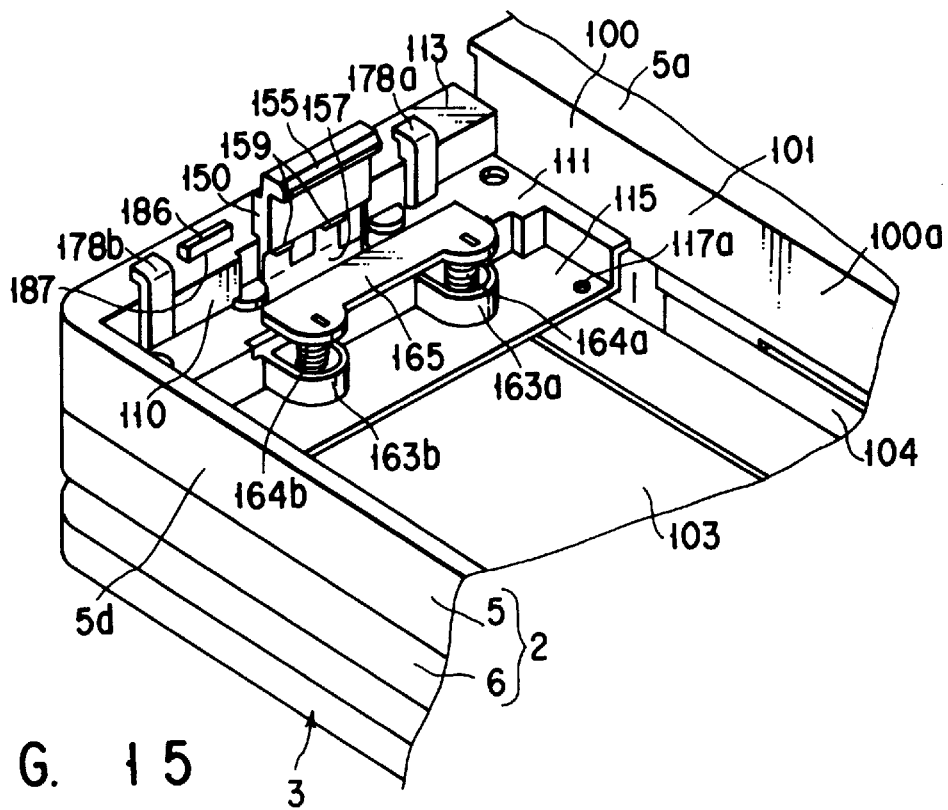

As shown in FIGS. 10 and 15, the battery container room 104 has an inner wall 110 facing the battery connector 108 and an upper wall 111 connected to the inner wall 110. The inner wall 110 is provided along the side wall 5c, inside the right side wall 5c of the lower housing 5, as shown in FIG.

16. Between the inner wall 110 and the side wall 5c, a clearance 112 is formed. The lower end portion of the inner wall 110 and the lower end portion of the side wall 5c are connected with each other through a connection wall 113. This connection wall 113 covers the lower end portion of the clearance 112, and faces the opening portion 100a. As shown in FIGS. 3, 10, and 15, the upper wall 111 extends horizontally between the front wall 5d of the lower housing 5 and the stand wall 101. The upper wall 111 faces the boss portions 33 of the arm rest 8, and the elongated portion 32b of the hinge device 29 is inserted between the upper wall 111 and the boss portions 33. The upper wall 111 and the elongated portion 32b are fixed to the boss portions 33 by screws 114.

The first pack receptacle 100 has a guide wall 115 connected to the upper wall 111. The guide wall 115 extends horizontally between the front wall 5d of the lower housing 5 and the stand wall 101. This guide wall 115 enters into the hard-disc container room 103, and is provided at a position closer to the arm rest 8 than the upper wall 111.

Figure 19A:
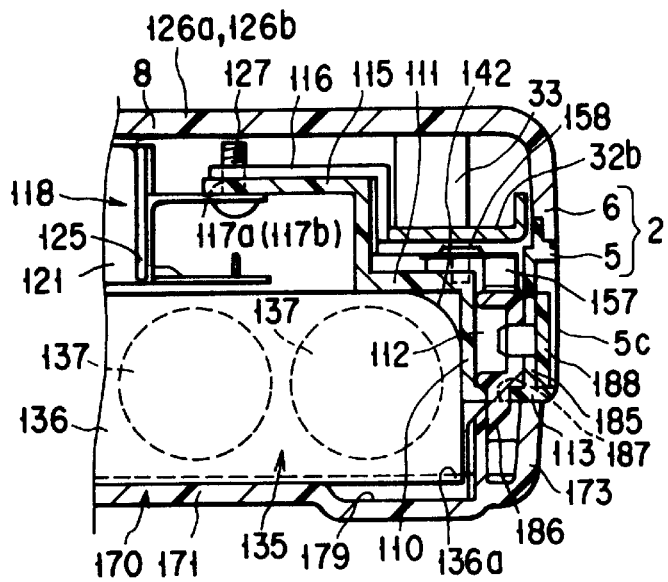
FIG. 19A is a cross-section of the portable computer where the battery cover is locked on the casing.

As shown in FIGS. 10 and 19A, the elongated portion 32b of the hinge device 29 has a pair of screw receiving portions 116 (one of which is shown). The screw receiving portions 116 are layered on the upper surface of the guide wall 115. A pair of through-holes 117a and 117b communicating with the screw receiving portion 116 are open in this guide wall 115.

As shown in FIGS. 10 and 11, a hard-disc drive device 118 as a first functional component is detachably contained in the hard disc container room 103 of the first pack receptacle 100. The hard-disc drive device 118 comprises a box-like housing 119. A magnetic head and a disc-like magnetic recording medium (not shown) are contained in the housing 119. The housing 119 has a size which allows the housing 119 to be engaged in the hard-disc container room 103. The housing 119 can be set in and removed out of the hard-disc container room 103 through the opening portion 100a of the bottom wall 5a and the battery container room 104. The hard-disc drive device 118 has a relay connector 120. The relay connector 120 is provided at an end portion of the housing 119. This relay connector 120 is arranged such that it is detachably connected with the hard-disc connector 105 when the hard-disc drive device 118 is contained in the hard-disc container room 103.

The housing 119 is provided with a bracket 121 made of sheet metal. The bracket 121 has a first cover portion 122 for covering the bottom surface of the housing 119 and a second cover portion 123 for covering the end surface of the housing 119. The first cover portion 122 has a flat plate-like shape. A pair of projections 130 serves as identification marks are formed on this first cover portion 122. These projections 130 project toward the battery container room 104 described above. The second cover portion 123 integrally comprises a stopper portion 125 to be hooked by a finger, and a pair of tongue parts 126a and 126b. The stopper portion 125 and the tongue parts 126a and 126b are positioned in the side opposite to the relay connector 120. The tongue parts 126a and 126b are arranged such that these parts are layered on the lower surface of the guide wall 115 when the hard-disc drive device 118 is contained in the hard-disc container room 103. Screws 127 penetrate through the tongue parts 126a and 126b. The screws 127 penetrate through through-holes 117a and 117b of the guide wall 114 and are screwed into the screw receive portion 116 described above. By thus screwing the screws 127, the hard-disc drive device 118 is fixed to the hard-disc container room 103.

The hard-disc drive device 118 as described above is attached to the hard-disc container room 103 in the following procedures. At first, the computer 1 is placed up side down, so that the bottom wall 5a of the casing 2 and the opening portion 100a of the first pack receptacle 100 are oriented upwardly, as shown in FIG. 11. In this condition, the hard-disc drive device 118 is inserted into the hard-disc container room 103 through the opening portion 100a of the bottom wall 5a and through the battery container room 104. In this manner, the relay connector 120 in the hard-disc drive device 118 faces the hard-disc connector 105, and simultaneously, the tongue parts 126a and 126b of the bracket 121 are layered on the guide wall 115.

In the next, a user hooks his or her finger on the stopper portion 125 and slides the hard-disc drive device 118 in the direction toward the hard-disc connector 105. By thus sliding the device 118, the relay connector 120 is engaged with the hard-disc connector 105, so that the hard-disc drive device 118 is electrically connected with the computer 1.

Further, screws 127 are inserted into the tongue parts 126a and 126b of the bracket 121 until these screws 127 are screwed into the screw receiving portion 116. As a result, the hard-disc drive device 118 is fixed to the hard-disc container room 103, maintaining the engagement between the relay connector 120 and the hard-disc connector 105. When the hard-disc drive device 118 is kept fixed to the hard-disc container room 103, as shown in FIGS. 10 and 12, the first cover portion 122 of the bracket 121 continues to the board support wall 102, and these first cover portion 122 and the board support wall 102 are positioned on one substantial same plane. Therefore, the first cover portion 122 constitutes the ceiling wall of the battery container room 104, in cooperation with the board support wall 102.

As shown in FIG. 11, a battery pack 135 as a second functional component is detachably contained in the battery container room 104. The battery pack 135 functions as a drive power source for the computer 1 when the computer 1 is used at a spot where commercial alternating current power source is not available. This battery pack 135 can be set in and removed out of the battery container room 104, through the opening portion 100a of the lower housing 5, like the hard-disc drive device 118.

As shown in FIG. 10, the battery pack 135 comprises a battery case 136 made of synthetic resin and a plurality of nickel hydrogen secondary batteries 137 contained in the battery case 136. The battery case 136 has a rectangular box-like shape in compliance with the shape of the opening of the opening portion 100a, and has a flat area larger than the hard-disc drive device 118. The batter pack 135 has a weight of about 300 to 600 g.

The battery case 136 has a first end provided with a plurality of terminal plates 138 and a second end positioned opposite to the first end. The terminal plates 138 are connected to the nickel hydrogen secondary battery 137, and serve as positive and negative terminals of the battery pack 135. The upper surface of the battery case 136 is arranged so as to face the board support wall 102 described above and the first cover portion 122 of the hard-disc drive device 118, when the battery pack 135 is contained in the battery container room 104. A pair of first concave portions 140 are provided in the upper surface of the battery case 136. In addition, a pair of second concave portions 141 are provided in the bottom surface of the battery case 136. The positions of the concave portions 140 and 141 are determined in accordance with the type and the performance of the battery pack 135. Therefore, if the position of the first and second concave portions 140 and 141 are observed, whether or not a battery pack 135 is applicable to the computer 1 can be identified. The second end of the battery case 136 has a bending portion 142 bent like an arc. The bending portion 142 is positioned at a corner portion defined by the end surface and the upper surface which are positioned opposite to the terminal plates 138 of the batter case 136.

This battery pack 135 is attached to the battery container room 104 in the following procedures. At first, as shown in FIG. 11, the computer 1 is placed up side down, so that the bottom wall 5a and the opening portion 100a of the first pack receptacle 100 face upwardly. In this state, the first end of the battery pack 135 is inserted into the battery container room 104 through the opening portion 100a, thereby making terminal plates 138 in contact with the connection terminals 109 of the battery connector 108. In the next, the battery pack 135 is rotated downwardly around a fulcrum of a connecting portion between the terminal plates 138 and the connection terminals 109, so that the battery pack 135 falls into the battery container room 104. As a result of this, the first concave portion 140 of the upper surface of the battery case 136 faces the projection 130 of the hard-disc drive device 118, and the project 130 enters into the first concave portion 140. Therefore, the battery pack 135 is contained in the battery container room 104, with the upper surface of the battery case 136 kept horizontally in contact with the board support wall 102 and the first cover portion 122 of the hard-disc drive device 118. Whether or not the battery pack 135 is applicable to the computer 1 is thereby determined.

Specifically, if an unallowable battery pack which has a first concave portion 140 formed at a different position is inserted into the battery container room 104, or if a battery pack is inserted up side down into the battery container room 104, the projection 130 of the hard-disc drive device 118 collides into the upper surface or bottom surface of the battery case 136. Then, the battery pack 135 leans in the battery container room 104, and therefore, cannot be properly contained in the battery container room 104. Therefore, an operator can thus confirm an wrong selection of a battery pack 135, or a reversed orientation of the battery pack 135, so that wrong attachment of the battery pack 135 can be prevented.

If a battery pack 135 is attached to the battery container room 104 in a correct manner, the battery pack 135 is pressed in the direction toward the inner wall 110, by the connection terminals 109 of the battery connector 108. As a result, the battery pack 135 is kept in the battery container room 104, covering the hard-disc drive device 118 from under side of this device 118.

Figure 16:
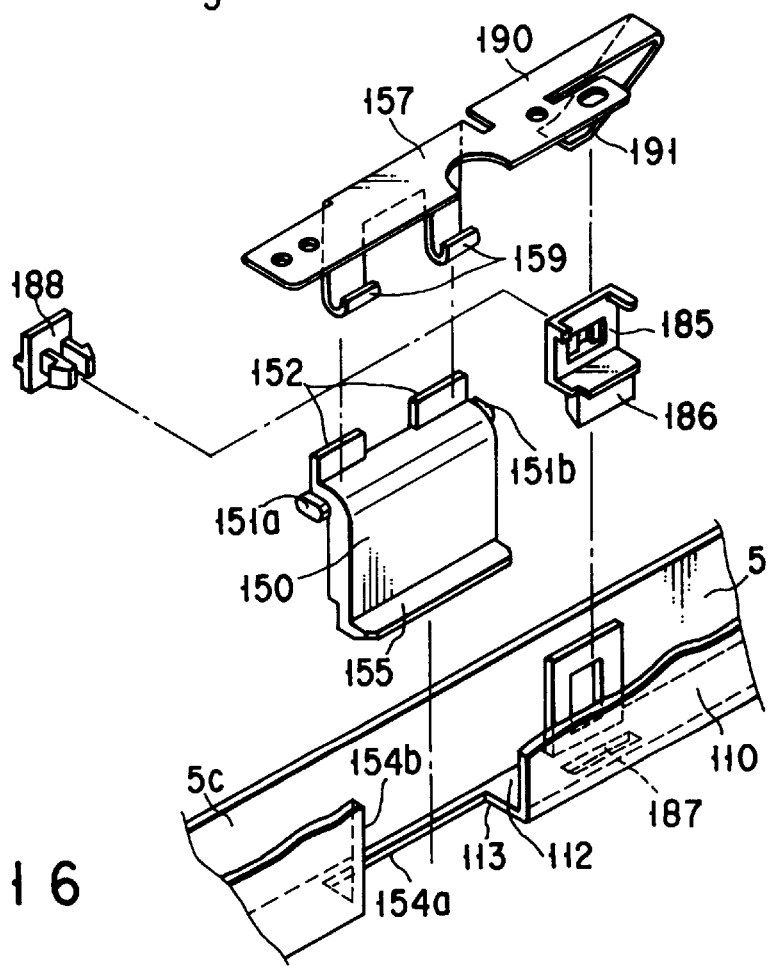

As shown in FIGS. 12 and 13, the battery container room 104 is provided with a locking member 150 for locking the battery pack 135. The locking member 150 is made of synthetic resin material, and is positioned in the side opposite to the battery connector 108. As shown in FIG. 16, the locking member 150 has a substantially flat plate-like shape. This locking member 150 comprises an end portion having a pair of shaft portions 151a and 151b as well as a pair of spring receiving portions 152, and another end having a stopper claw 155. The locking member 150 is inserted in the clearance 112 between the side wall 5c of the lower housing 5 and the inner wall 110. The connection wall 113 which closes the lower end of the clearance 112 has a first through-hole 154a. The inner wall 110 connected to the connection wall 113 has a second through-hole 154b. These first and second through-holes 154a and 154b communicate with each other at the right end portion of the battery container room 104. The locking member 150 is inserted in the first through-hole 154a, and the shaft portions 151a and 151b of the locking member 150 are rotatably hooked on an open edge portion of the first through-hole 154a. Therefore, an end portion of the locking member 150 is exposed to the battery container room 104 through the second through-hole 154b, and the spring receiving portions 152 thereof faces the side wall 5c. In addition, the other end portion of the locking member 150 projects downwardly through the first through-hole 154, and the stopper claw 155 thereof is positioned below the connection wall 113.

As shown in FIG. 18A, where the battery pack 135 is correctly attached to the battery container room 104, an end surface continued to the bending portion 142 of the battery case 136 faces the inner wall 110. The end surface of the battery case 136 is in contact with the locking member 150, and the stopper claw 155 of this locking member 150 is hooked on a corner portion 136a defined by the bottom surface and the end surface of the battery case 136. Therefore, the locking member 150 is supported on the battery container room 104, such that the locking member 150 is rotatable between a locked position as shown in FIG. 18A in which the stopper claw 155 is hooked on the corner portion 136a and a lock-released position as shown in FIG. 18B in which the stopper claw 155 gets off from the corner portion 136a of the battery case 136.

As shown in FIGS. 18A and 18B, a spring member 157 made of sheet metal is provided on the upper surface of the upper wall 111. The spring member 157 has a pair of first press parts 159 which can be elastically deformed. The first press parts 159 enter into the clearance 112, and the top end of the first press parts 15 are in contact with the spring receiving portion 152 of the locking member 150. The first press parts 159 press the spring receiving portion 152 against the side wall 5c. By thus pressing the spring receiving portion 152, the locking member 150 is always kept in a locked position, and the stopper claw 155 of the locking member 150 is kept engaged with the battery case 136.

As shown in FIG. 14, if the battery pack 135 is inserted into the battery container room 104, oriented in a correct direction, the bending portion 142 of the battery case 136 is brought into contact with the stopper claw 155. In this state, the battery pack 135 is pressed in the direction toward the inner wall 110 by the connection terminals 109 of the battery connector 108, so that the stopper claw 155 is slidably pressed against the bending portion 142 in accordance with an operation of inserting the battery pack 135. In this manner, the locking member 150 is gradually pushed back from the locked position to the lock-released position in accordance with the shape of the bending portion 142. As a result of this, the bending portion 142 of the battery pack 135 functions as a kind of cam surface which rotates the locking member 150 to the lock-released position, so that the operation of inserting the battery pack 135 is not disturbed.

As shown in FIGS. 10 and 18A, when the battery pack 135 is correctly attached to the battery container room 104, the corner portion 136a of the battery case 136 faces the stopper claw 155, thereby releasing the pressure from the battery case 136 against the stopper claw 155. Therefore, the locking member 150 is forcibly rotated to the locked position by the spring member 157, and the stopper claw 155 is hooked on the corner portion 136a of the battery case 136. As a result of this, the battery pack 135 is maintained in the battery container room 104.

When the battery pack 135 is inserted up side down in the battery container room 104, the corner portion 136a positioned in the side opposite to the bending portion 142 of the battery case 136 is brought into contact with the stopper claw 155. This corner portion 136a is sharp at right angles.

Therefore the corner portion 136a is caught by the stopper claw 155, so that the battery pack 135 cannot be inserted any more into the battery container room 104. Due to this, an operator can find that the battery pack 135 is inserted up side down. Thus, wrong insertion of the battery pack 135 is thus prevented previously.

As shown in FIG. 15, a pair of spring mount portions 163a and 163b are formed on the lower surface of the guide wall 115 facing the battery container room 104. The spring mount portions 163a and 163b have hollow cylindrical shapes. These spring mount portions 163a and 163b are placed apart from each other in the direction of the short axis X2, in the vicinity of the locking member 150. A pressure means is supported by the spring mount portions 163a and 163b. The pressure means comprises a pair of compression coil springs 164a and 164b mounted on the spring mount portions 163a and 163b, and a pressure plate 165 held between top end portions of the compression coil springs 164a and 164b. The pressure plate 165 is in contact with the upper surface of the battery case 136, with the battery pack 135 attached to the battery container room 104. Therefore, the compression coil springs 164a and 164b are compressed between the spring mount portions 163a and 163b and the battery pack 135, and the second end of the battery pack 135 is continuously applied with a force acting so as to push out the battery pack 135 toward the opening portion 100a.

Consequently, when the locking member 150 is rotated from the locked position to the lock-released position to detach the battery pack 135 from the battery container room 104, the second end of the battery pack 135 is forcibly pushed out from the battery container room 104. By thus pushing out the battery pack 135, the battery pack 135 is rotated around a fulcrum of a connecting portion between the battery connector 108 and the terminal plates 138, and the second end thereby jumps up from the opening portion 100a of the casing 2.

As shown in FIG. 13, the bottom wall 5a of the lower housing 5 is equipped with a battery cover 170 made of synthetic resin. The battery cover 170 serves to detachably cover the opening portion 100a of the first pack receptacle 100 and the locking member 150. The battery cover 170 has a cover body 171. The cover body 171 has a size equal to the shape of the opening of the opening portion 100a, and is positioned in the same plane as the bottom wall 5a of the lower housing 5. The cover body 171 has a first side wall 172 continued to the front wall 5d of the lower housing 5, a second side wall 173 continued to the side wall 5c in the right side of the lower housing 5, and a third side wall 174 in contact with the stand wall 101 of the first pack receptacle 100. A pair of first engaging parts 171a and 171b are formed on the cover body 171. The first engaging parts 171a and 171b are provided apart from each other, in the direction of the short axis X2 of the opening portion 100a, and is detachably hooked on the opening edge portion of the opening portion 100a. The first side wall 172 has an edge portion where a pair of second engaging parts 172a and 172b are formed. A pair of third engaging parts 174a and 174b are formed at the edge portion of the side wall 174. The second engaging parts 172a and 172b are arranged apart from each other in the direction of the long axis X1 of the opening portion 100a. The third engaging parts 174a and 174b are arranged part from each other in the direction of long axis X1 of the opening portion 100a. A pair of fourth engaging parts 173a and 173b are formed on the second side wall 173. These fourth engaging parts 173a and 173b are arranged apart from each other in the direction of the short axis X2 of the opening portion 100a, and face the connection wall 113 of the lower housing 5.

As shown in FIG. 12, a pair of engaging projections 176a and 176b as well as a pair of engaging projections 177a and 177b are respectively formed on the stand wall 101 facing the battery container room 104 as well as the front wall 5d. The engaging projections 176a and 176b are provided apart from each other in the direction of the long axis X1 of the opening portion 100a. The engaging projections 177a and 177b are provided apart from each other in the direction of the long axis X1 of the opening portion 100a. In addition, a pair of stopper nails 178a and 178b are formed on the connecting wall 113. These stopper nails 178a and 178b are provided apart from each other in the direction of the short axis X2 of the opening portion 100a.

The battery cover 170 is covered over the opening portion 100a of the lower housing 5 and is then slided in the direction toward the battery connector 108. The battery cover 170 is thereby installed on the lower housing 5. Specifically, when the battery cover 170 is slided, the first engaging parts 171a and 171b are caught by the opening edge portion of the opening portion 100a, and simultaneously, the second engaging parts 172a and 172b and the third engaging parts 174a and 174b are caught by the engaging projections 176a, 176b, 177a, and 177b. The fourth engaging parts 173a and 173b are also caught by the stopper nails 178a and 178b. As a result of this, the battery cover 170 is installed on the lower housing 5, with the opening portion 100a thereby covered, as shown in FIG. 10, and the inner surface of the cover body 171 is brought into contact with the bottom surface of the battery pack 135. A concave portion 179 for avoiding interference with the stopper claw 155 of the locking member 150 is formed on the inner surface of the cover body 171.

Figure 19B:
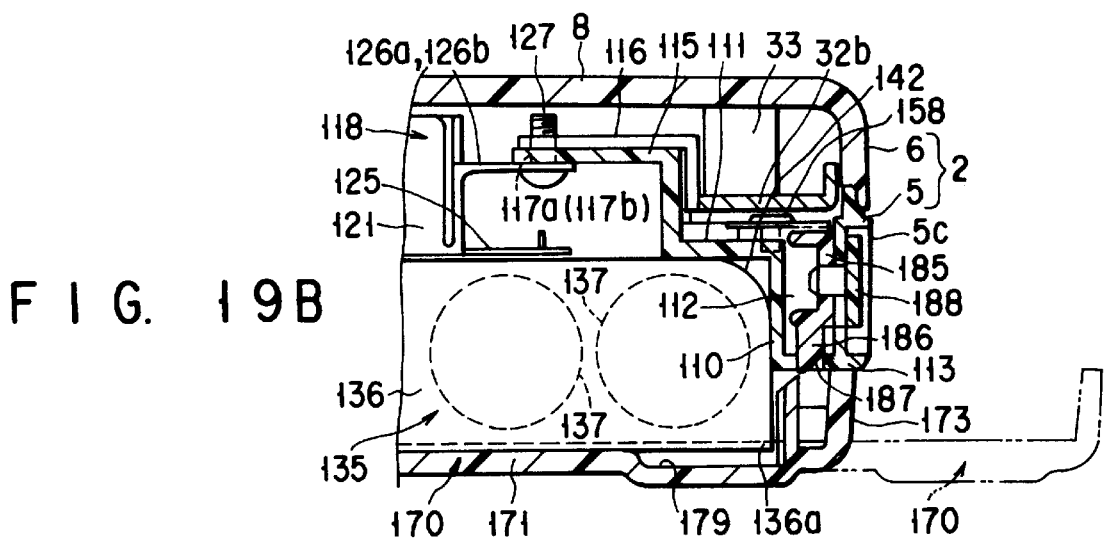
FIG. 19B is a cross-section of the portable computer where the locking of the battery pack is released.
Figure 20:
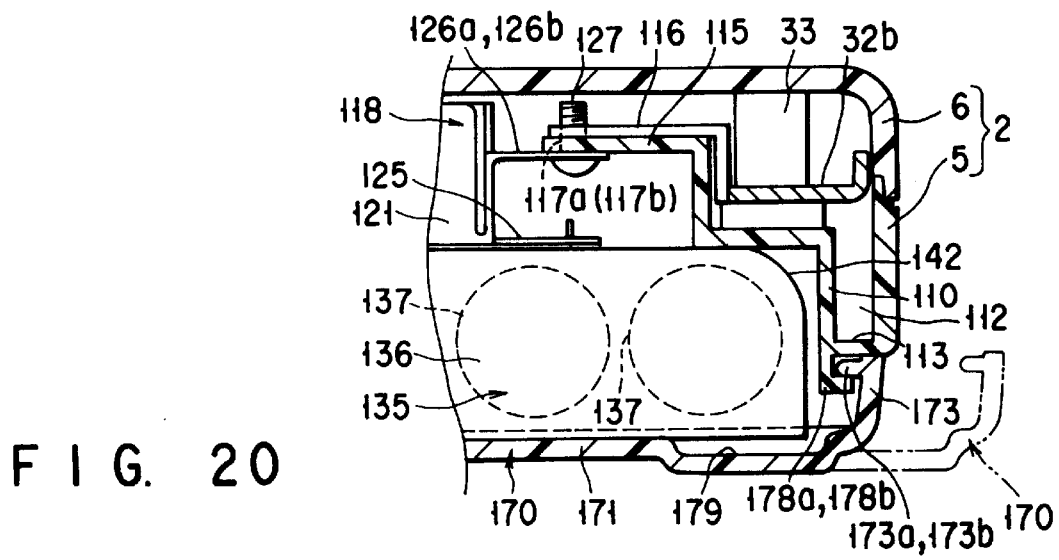

As shown in FIGS. 16 and 19A, the lower housing 5 comprises a holding member 185. The holding member 185 serves to keep the battery cover 170 installed on the lower housing 5. The holding member 185 is provided in the clearance 112 described above, and is arranged adjacent to the locking member 150. The holding member 185 has a lock claw 186 extending toward the connecting wall 113. The top end of the locking claw 186 faces a through-hole 187 opened in the connecting wall 113. The the holding member 185 is supported on the lower housing 5, such that the holding member 185 is movable between a first position as shown in FIG. 19A where the locking claw 186 projects from the through-hole 187 and a second position as shown in FIG. 19B where the locking claw 186 enters into the through-hole 187. This holding member 185 comprises an operation lever 188. The operation lever 188 is exposed to the right side wall 5c of the lower housing 5, and the holding member 185 is moved between the first and second positions, by manually operating the operation lever 188.

As shown in FIG. 16, the spring member 157 has an elongated portion 190 extending upwardly over the holding member 185. A second pressure part 191 which can be elastically deformed in the downward direction is integrally formed on the top end of the elongated portion 190. The top end of the second pressure part 191 is brought into contact with the holding member 185, thereby pressing the holding member 185 in a downward direction. Therefore, the holding member 185 is continuously held in the first position.

As shown in FIG. 19A, when the battery cover 170 is kept attached to the lower housing 5, the locking claw 186 is hooked on the second side wall 173 of the battery cover 170. Hence, even when it is attempted to slide the battery cover 170 away from the battery connector 108, the locking claw 186 prevents the battery cover 170 from being slided. As a result of this, the battery cover 170 is kept on the lower housing 5, covering the opening portion 100a and the locking member 150.

As shown in FIGS. 4 and 5, the keyboard support wall 11 of the upper housing 6 described above comprises a sub-battery container portion 200. The sub-battery container portion 200 has a dish-like shape open in the upward direction, and is positioned inside the opening portion 11a of the keyboard support wall 11. The sub-battery container 200 is provided between the heat sink 55 and the card receptacle 71. The sub-battery container portion 200 has a side wall 201 connected to the opening edge portion of the opening portion 11a described above. The side wall 201 is provided adjacent to the plate body 65 of the heat radiation plate 64. The plate body 65 has a support part 202 for supporting the side wall 201. Therefore, the sub-battery container portion 200 is supported by the heat radiation plate 64, thereby preventing the sub-battery container portion 200 from being deformed inside the opening portion 11a.

As shown in FIG. 4, a sub-battery 203 is contained in the sub-battery container portion 200. The sub-battery 203 serves to set a resume function, and has a flat plate-like shape. The sub-battery 203 is connected to the first circuit board 34 through a lead line 204 having a connector 205.

Figure 21:
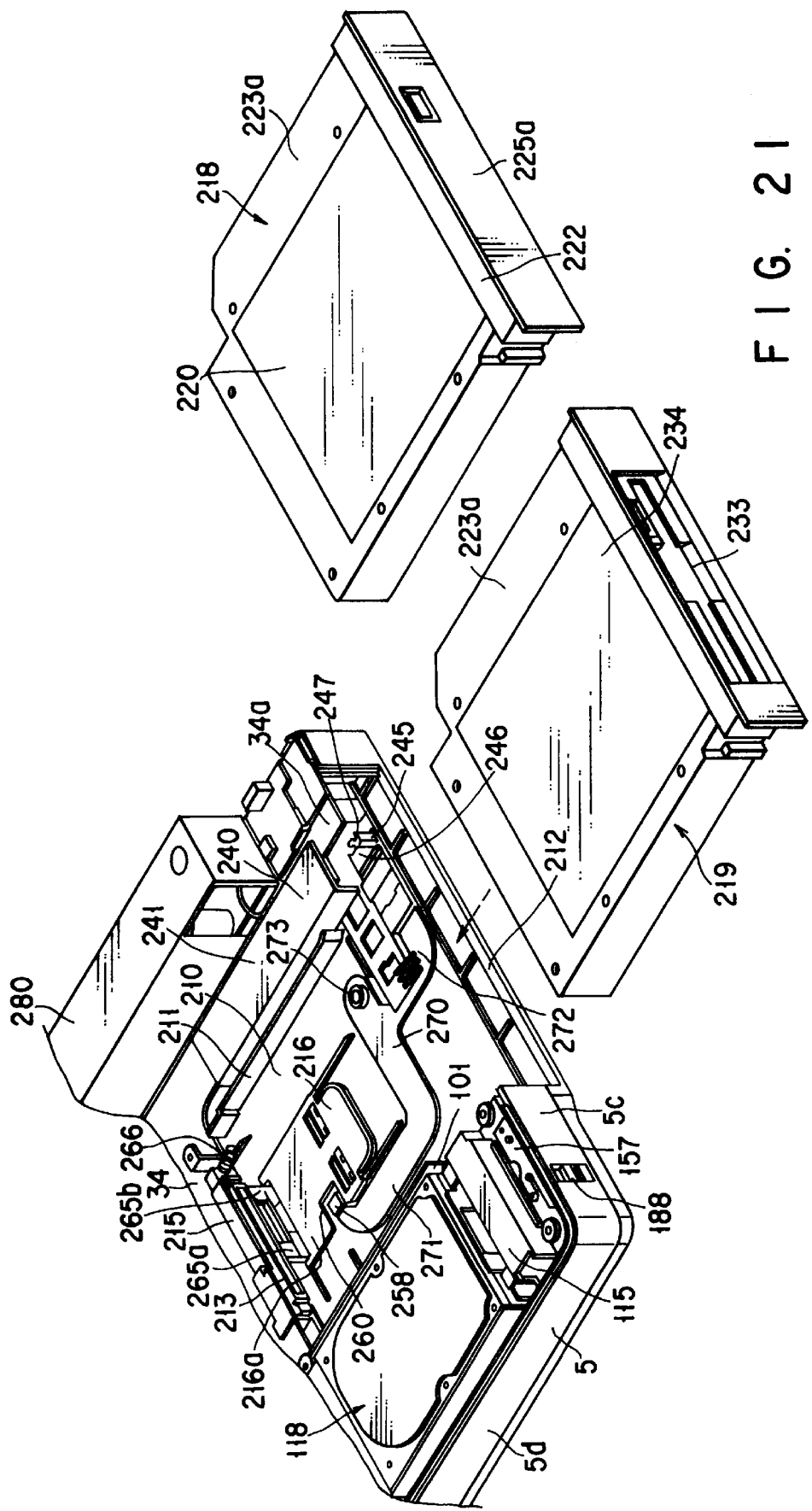

As shown in FIGS. 3 and 21, the casing 2 comprises a second pack receptacle 210. The second pack receptacle 210 is positioned behind the first pack receptacle 100 and below the right half of the keyboard 13. The second pack receptacle 210 is defined by the bottom wall 5a of the lower housing 5 and the stand wall 101. A guide wall 211 is formed on the bottom wall 5a. The guide wall 211 extends along the connector support portion 34a of the first circuit board 34, in parallel with the stand wall 101.

As shown in FIG. 27A, the second pack receptacle 210 comprises an insertion port 212. The insertion port 212 is open in the right side wall 5c of the lower housing 5, and the support stay 32a of the hinge device 29 is provided along the upper edge opening portion of the insertion port 212. Therefore, the support stay 32a bridges over the insertion port 212, and the support stay 32a ensures the rigidity of the opening portion of the insertion port 212 in the casing 2.

As shown in FIGS. 21 and 27A, the second pack receptacle 210 comprises a relay connector 213. The relay connector 213 extends in the depth direction of the casing 2, at the terminating end the second pack receptacle 210, and faces the insertion port 212. The relay connector 213 is supported on the right end portion of the first circuit board 34, and is arranged adjacent to the bottom wall 5a of the lower housing 5. The holder 215 made of sheet metal is secured on the upper surface of the first circuit board 34, by screws. The holder 215 covers the relay connector 213, and the third circuit board 36 described above is secured on the holder 215, by screws.

As shown in FIGS. 21 and 27A, the second pack receptacle 210 comprises an insertion guide 216. The insertion guide 216 is formed on the bottom wall 5a of the lower housing 5. This insertion guide 216 has a flat guide surface 216a slightly projecting from the upper surface of the bottom wall 5a. The guide surface 216a extends from immediately before the relay connector 213 toward the insertion port 212.

As shown in FIG. 21, a CD-ROM drive device 218 and a floppy disc drive device 219 are selectively and detachably attached to the second pack receptacle 210. Each of these CD-ROM drive device 218 and the floppy disc drive device 219 is packaged as a module having a specialized function.

Figure 22:
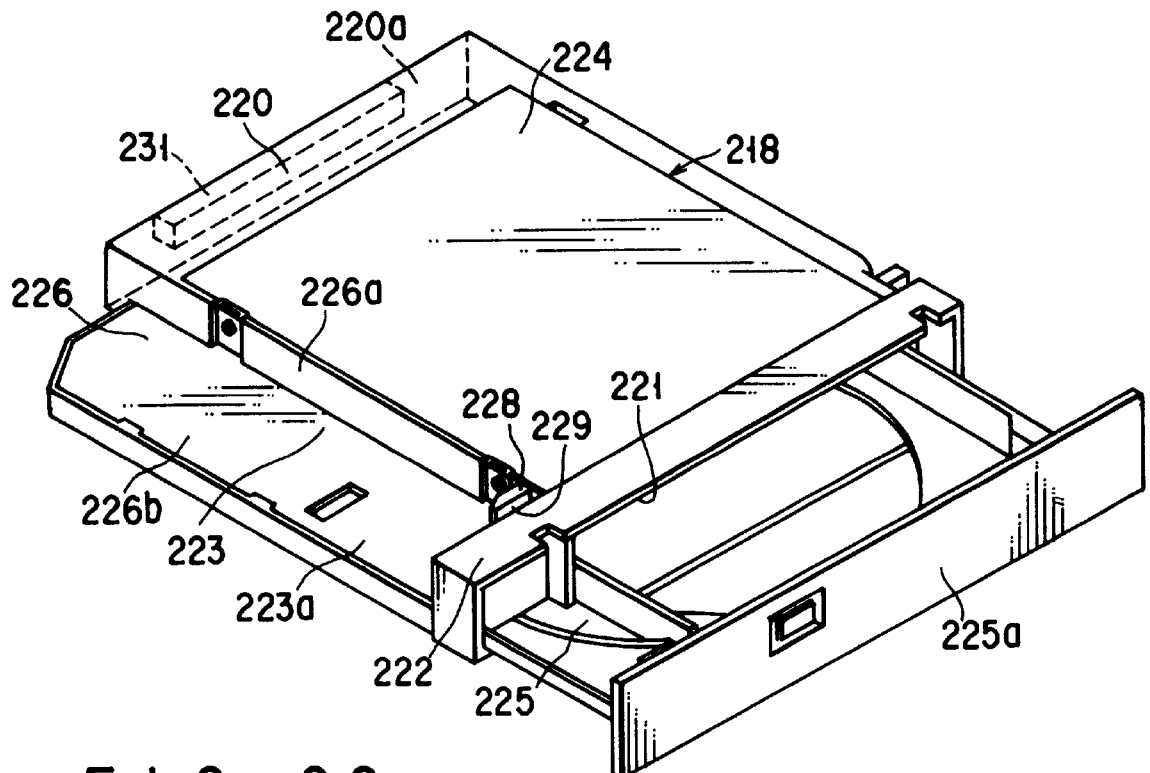

As shown in FIG. 22, the CD-ROM drive device 218 comprises a casing 220 having a flat box-like shape. The casing 220 has a guide frame 222 in which a disc insertion port 221 is opened. The guide frame 222 has a size which allows the guide frame 222 to be engaged in the insertion port 212. The casing 220 comprises a disc container portion 223 and a disc drive portion 224. The disc container portion 223 includes a tray 225 which can be pulled out of the casing 220. The tray 225 serves to support an optical disc (not shown), and the size of this tray 225 is defined in accordance with the diameter of an optical disc. An end plate 225a for opening and closing the disc insertion port 221 is provided at an end of the tray 225. The disc drive portion 224 has a motor for rotating an optical disc and a control unit for controlling the motor, and is positioned below the disc container portion 223.

As shown in FIGS. 3 and 22, the disc container portion 223 has an overhang portion 223a extending over the side of the disc drive portion 224. The casing 220 has a concave portion 226 defined by the lower surface of the overhang portion 223a and the side surface of the disc drive portion 224. The concave portion 226 has a vertical side surface 226a and a horizontal lower surface 226b connected to the upper end of the side surface 226a, and is open toward the lateral side and the lower side of the casing 220. This concave portion 226 has a stopper wall 228 at an end portion adjacent to the guide frame 222. The stopper wall 228 laterally projects from the side surface 226a of the concave portion 226, and a locking groove 229 opened in the lateral direction is formed between the stopper wall 228 and the guide frame 222. The corner portion opposite to the guide frame 222 of the stopper wall 228 forms a slanting surface 228a obliquely cut.

As shown in FIG. 22, the casing 220 has a connector mount surface 220a. The connector mount surface 220a is positioned in the side opposite to the guide frame 222. In the center portion of the connector mount surface 220a, a CD-ROM connector 231 is provided. The CD-ROM connector 231 is detachably connected to the relay connector 213.

As the CD-ROM drive device 218 is inserted into the second pack receptacle 210 from the insertion port 212, the bottom surface of the casing 220 is brought into contact with the guide surface 216a of the insertion guide 216 such that the bottom surface is slidable. Accordingly, the side surface 226a of the concave portion 226 of the casing 220 is brought into contact with the guide wall 211, and the position of the CD-ROM connector 231 is aligned with the position of the relay connector 213. These connectors 213 and 231 are engaged with each other when the CD-ROM drive device 218 is inserted to the terminating end of the second pack receptacle 210. The CD-ROM drive device 218 is thereby electrically connected to the computer 1. When the CD-ROM drive device 218 is kept contained in the second pack receptacle 210, the concave portion 226 of the casing 220 faces the connector support portion 34a of the first circuit board 34. Therefore, the connector support portion 34a enters in the concave portion 226 of the casing 220.

Figure 23:
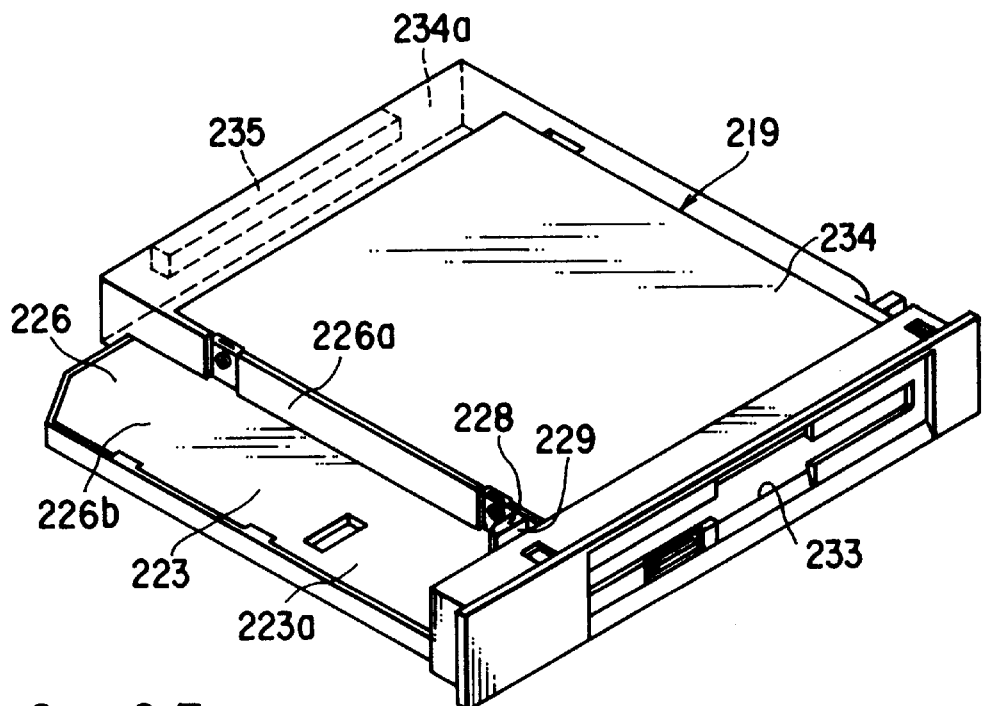

As shown in FIG. 23, the floppy disc drive device 219 comprises a casing 234 having a flat box-like shape, in which a disc insertion port 233 is opened. The casing 234 has a size substantially equal to the casing 220 of the CD-ROM drive device 218 described above, and has an overhang portion 223a, a concave portion 226, a stopper wall 228, and a locking groove 229, which are respectively similar to corresponding elements of the casing 220. The casing 234 has a connector mount surface 234a. The connector mount surface 234a is positioned in the side opposite to the disc insertion port 233, and a FDD connector 235 is provided in the center portion of this connector mount surface 234a. The FDD connector 235 is detachably connected to the relay connector 213.

As the floppy disc drive device 219 is gradually inserted into the second pack receptacle 210 from the insertion port 212, the bottom surface of the casing 234 is brought into contact with the guide surface 216a of the insertion guide 216 such that the bottom surface is slidable. Accordingly, the side surface 226a of the concave portion 226 of the casing 234 is brought into contact with the guide wall 211, and the position of the FDD connector 235 is aligned with the position of the relay connector 213. These connectors 213 and 231 are engaged with each other when the floppy disc drive device 219 is inserted to the terminating end of the second pack receptacle 210. The floppy disc drive device 219 is thereby electrically connected to the computer 1. When the floppy disc drive device 219 is kept contained in the second pack receptacle 210, the concave portion 226 of the casing 234 faces the connector support portion 34a of the first circuit board 34. Therefore, the connector support portion 34a enters in the concave portion 226 of the casing 234.

As shown in FIG. 21, a protect cover 240 made of metal is mounted on the connector support potion 34a. The protect cover 240 has a flat ceiling portion 241 facing the upper surface of the connector support portion 34a. The ceiling portion 241 covers and hide various circuit components and wirings installed on the upper surface of the connector support portion 34a. Therefore, when the CD-ROM drive device 218 or the floppy disc drive device 219 is detached from the second pack receptacle 210, the connector support portion 34a is not observed through the insertion port 212, so that the commercial value of the computer 1 can thus be raised. In addition, due to the protect cover 240, foreign objects are advantageously prevented from entering into the connector support portion 34a.

As shown in FIG. 3, the ceiling portion 241 of the protect cover 240 faces the lower surface 226b of the concave portion 226 of the casing 220 or 234, when the CD-ROM drive device 218 or the floppy disc drive device 219 is contained in the second pack receptacle 210. Therefore, the ceiling portion 241 can be used as a guide for inserting the CD-ROM drive device 218 or the floppy disc drive device 219 into the second pack receptacle 210, if the ceiling portion 241 is arranged so as to have a contact with the lower surface 226b of the concave portion 226.

Figure 26A:
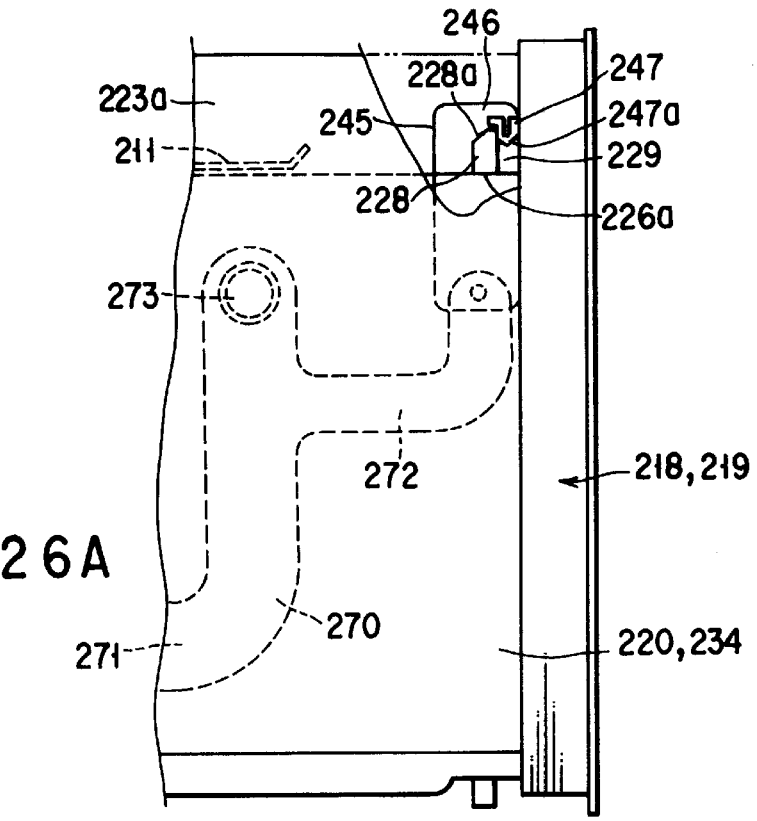
FIG. 26A is a plan view where the CD-ROM drive device or the floppy disc drive device is locked on the second pack receptacle.

As shown in FIGS. 21, 24, and 26A, the second pack receptacle 210 comprises a stopper 245 for locking the CD-ROM drive device 218 or the floppy disc drive device 219 in the second pack receptacle 210. The stopper 245 has a slider 246 having a flat plate-like shape. The slider 246 is provided on the upper surface of the bottom wall 5a of the lower housing 5, and is positioned between the insertion port 212 and the guide wall 211. This slider 246 is positioned between the casing 220 or 234 and the bottom wall 5a, while the CD-ROM drive device 218 or the floppy disc drive device 219 is kept attached to the second pack receptacle 210.

The slider 246 has an end facing the concave portion 226 of the casing 220 or 234. An engaging projection 247 projects from the end of the slider 246. The engaging projection 247 is detachably engaged with the locking groove 229 of the casing 220 or 234, and is positioned in the vicinity of the insertion port 212. The engaging projection 247 has a slanting surface 247a obliquely cut out at a corner portion facing the insertion port 212. The slanting surface 247a is arranged so as to be in contact with or to face the slanting surface 228a of the stopper wall 228 when the CD-ROM drive device 218 or the floppy disc drive device 219 is inserted into the second pack receptacle 210. These slanting surfaces 247a and 228a are oblique in the same direction.

Figure 26B:
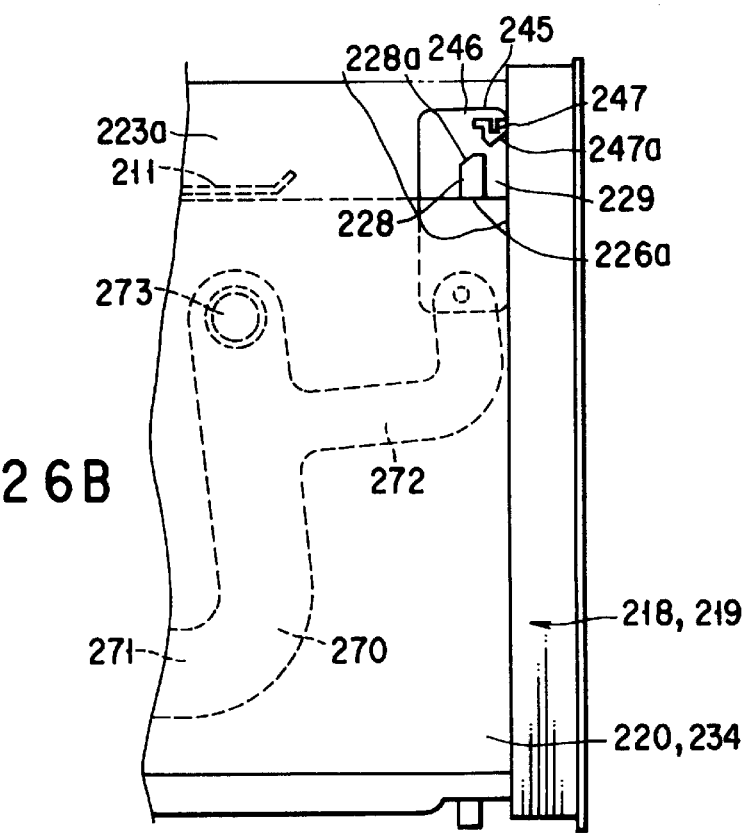
FIG. 26B is a plan view where the locking of the CD-ROM drive device or the floppy disc drive device is released.

The slider 246 is supported on the bottom wall 5a of the lower housing 5, such that the slider 246 can be slided between a locked position as shown in FIG. 26A where the engaging projection 247 is engaged with the locking groove 229 and a lock-released position as shown in FIG. 26B where the engaging projection 247 is released off in the side of the locking groove 229. This slider 246 comprises an operation lever 248. The operation lever 248 is exposed to the bottom wall 5a of the lower housing 5, as shown in FIG. 2. By manually operating the operation lever 248, the slider 246 is moved between the locked position and the lock-released position.

Figures 28A, 28B:
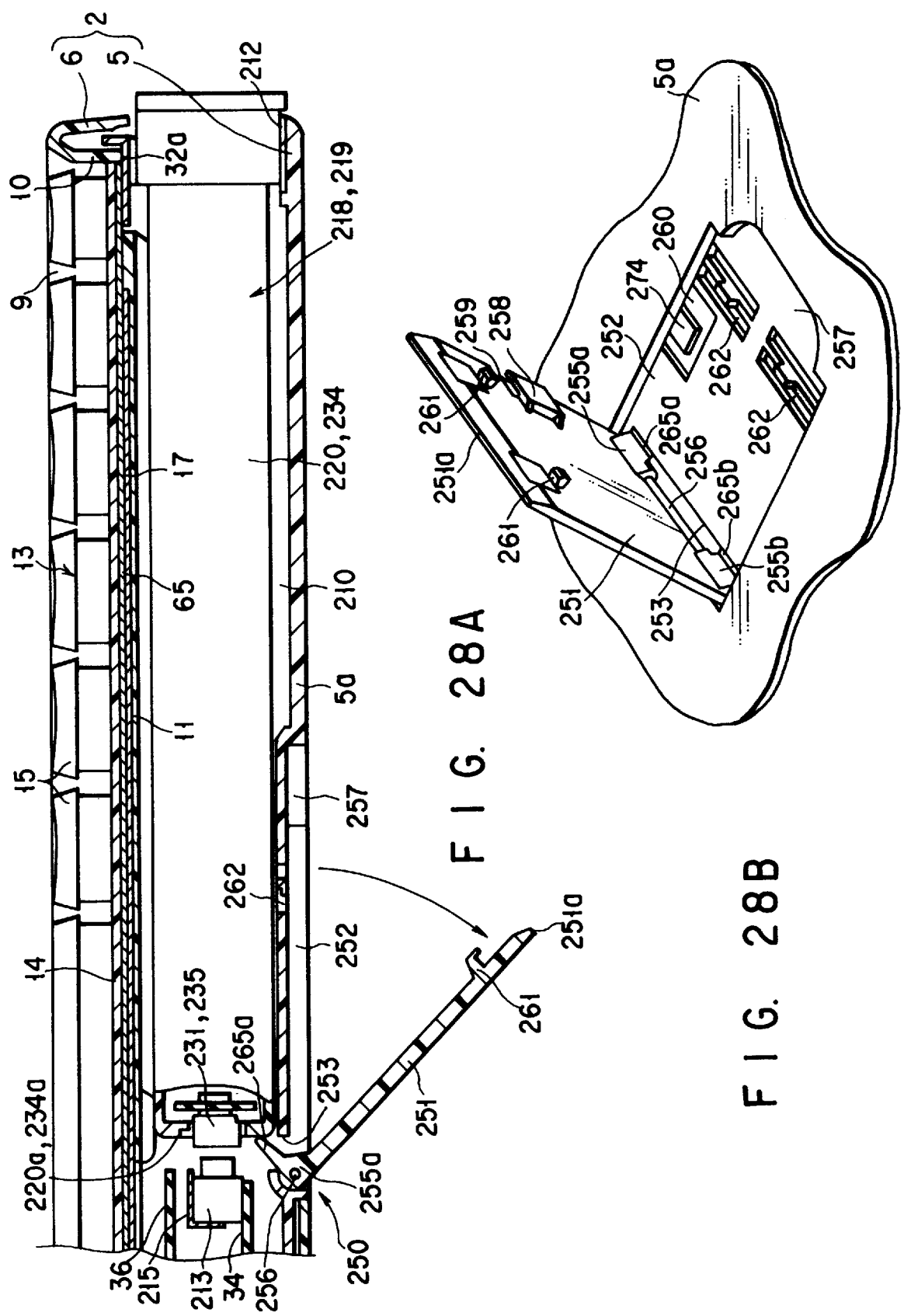
FIG. 28A is a cross-section of the portable computer where the operation lever of the ejector is rotated to a second position.
FIG. 28B is a perspective view where the operation lever of the ejector is rotated to the second position.

As shown in FIGS. 27A and 28B, the second pack receptacle 210 comprises an ejector 250. The ejector 250 is used to eject the CD-ROM drive device 218 or the floppy disc drive device 219 from the second pack receptacle 210. The ejector 250 comprises an operation lever 251 made of synthetic resin. The operation lever 251 has a flat rectangular shape. This operation lever 251 is supported on the bottom wall 5a of the lower housing 5. This bottom wall 5a has a storage concave portion 252 for storing the operation lever 251. The storage concave portion 252 is open in the lower surface of the bottom wall 5a, at a position corresponding to the insertion guide 216. The storage concave portion 252 has an end portion positioned below the relay connector 213. A through-hole 253 communicating with the second pack receptacle 210 is open in the end portion of the storage concave portion 252. The opening of the through-hole 253 has a shape extending along the relay connector 213.

As shown in FIG. 28B, the operation lever 251 has a pair of boss portions 255a and 255b which enter into the through-hole 253. The boss portions 255a and 255b are rotatably pivoted on the bottom wall 5a through the pivot shaft 256. Therefore, the operation lever 251 is rotatable between a first position where the operation lever 251 enters in the storage concave portion 252 and a second position where the operation lever 251 projects below the bottom wall 5a, around the pivot shaft 256 as a fulcrum. Where the operation lever 251 is rotated to be situated at the first position, the operation lever 251 extends continuously to the bottom wall 5a.

As shown in FIGS. 2 and 27A, the storage concave portion 252 has an escape portion 257 for allowing insertion of a finger. The escape portion 257 is made of a concave having a depth equal to the storage portion 252, and the edge portion 251a of the operation lever 251 opposite to the boss portions 255a and 255b faces the escape portion 257. Therefore, if the finger is inserted into the escape portion 257, the finger can be hooked on the edge portion 251a of the operation lever 251, so that the operation lever 251 can be rotated from the first position toward the second position.

Figure 29A:
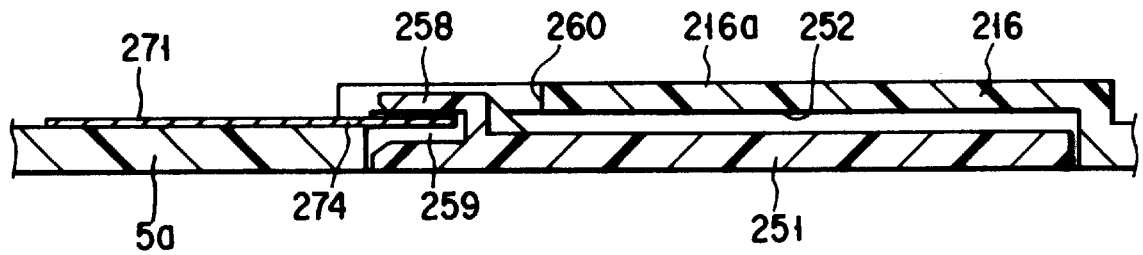
FIG. 29A is a cross-section where the operation lever of the ejector is locked.

As shown in FIG. 29A, the operation lever 251 has a stopper wall 258. The stopper wall 258 is formed on the upper surface of the operation lever 251. An engaging groove 259 is formed between the stopper wall 258 and the upper surface of the operation lever 251. This engaging groove 259 is open toward the side of the operation lever 251. An opening portion 260 is formed in the storage concave portion 252. This opening portion 260 is open in the guide surface 216a of the insertion guide 216. Therefore, if the operation lever 251 is rotated to the first position, as shown in FIG. 29A, the stopper wall 258 enters into the opening portion 260, and the engaging groove 259 is exposed to the upper surface of the bottom wall 5a.

As shown in FIGS. 27B and 28B, a pair of engaging projections 261 are provided on the upper surface of the operation lever 251. These engaging projections 261 are detachably engaged in engaging holes 262 in the bottom surface of the storage concave portion 252 when the operation lever 251 is rotated to the first position. Due to the engagement, the operation lever 251 is kept at the first position.

As shown in FIG. 27A and 28B, the boss portions 255a and 255b of the operation lever 251 respectively have pressure parts 265a and 265b extending toward the relay connector 213. These pressure parts 265a and 265b are arranged apart from each other in the lengthwise direction of the relay connector 213, between the relay connector 213 and the bottom wall 5a of the lower housing 5. When the operation lever 251 is rotated to the first position, the pressure parts 265a and 265b are made to stand substantially vertically with respect to the bottom wall 5a, and positioned below the relay connector 213. Therefore, the pressure parts 265a and 265b face the connector mount surface 220a or 234a of the device 218 or 219, when the CD-ROM drive device 218 or the floppy disc drive device 219 is kept attached to the second pack receptacle 210.

As shown in FIG. 28A, when the operation lever 251 is rotated from the first position to the second position, the boss portions 255a and 255b are rotated around the axis. The pressure parts 265a and 265b fall forward toward the connector mount surface 220a or 234a, and the connector mount surface 220a or 234a is pressed in a direction in which the surface is released apart from the relay connector 213. Therefore, the CD-ROM drive device 218 or the floppy disc drive device 219 is pushed out of the insertion port 212, and the engagement between the relay connector 213 and the CD-ROM connector 231 or the FDD connector 253 is released. In this case, the length to the edge portion 251a for hooking the finger from the pivot shaft 256 as the rotation center of the operation lever 251 is much greater than the length from the pivot shaft 256 to the contact portion between the pressure parts 265a and 265b and the connector mount surface 220a or 234a, as is apparent from FIG. 28A.

Figure 25:
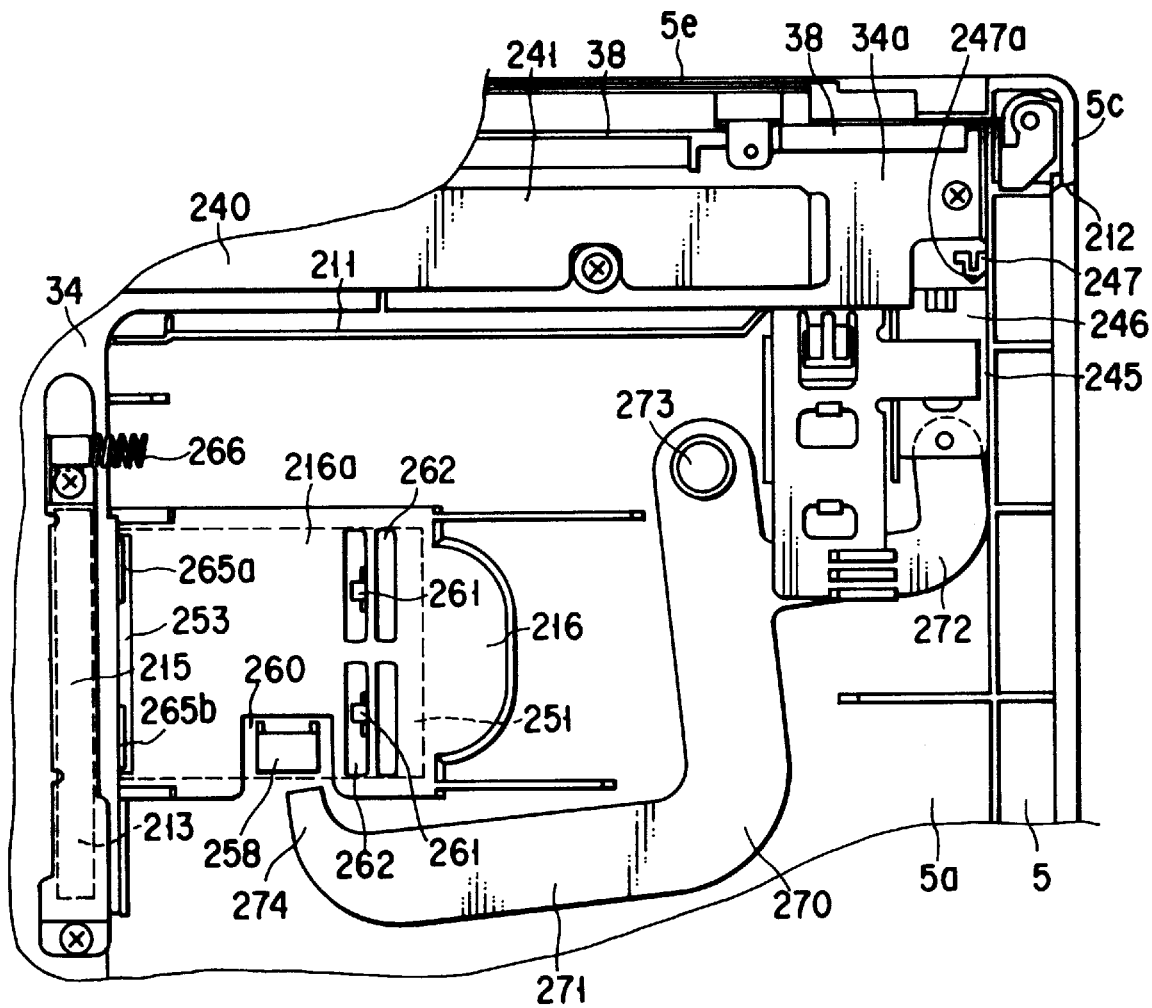

As shown in FIGS. 21, 24, and 25, a compression coil spring 266 is provided at the second pack receptacle 210. The compression coil spring 266 is supported on an end portion of the holder 215, and is arranged adjacent to the relay connector 213. This compression coil spring 266 is forcibly compressed between the connector mount surface 220a or 234a and the holder 215, when the CD-ROM drive device 218 or the floppy disc drive device 219 is contained in the second pack receptacle 210. Therefore, the CD-ROM drive device 218 or the floppy disc drive device 219 is applied with a force by which the device 218 or 219 is continuously pressed against the insertion port 212. As a result of this, when the operation lever 251 is rotated to the second position and the CD-ROM drive device 218 or the floppy disc drive device 219 is pushed out of the second pack receptacle 210, the pressure force from the compression coil spring 266 is applied thereto.

As shown in FIGS. 21 and 24, the bottom wall 5a of the lower housing 5 facing the second pack receptacle 210 is provided with a link lever 270. This link lever 270 serves to linking the stopper 245 with the ejector 250. The link lever 270 has an L-shaped lever body 271 and an arm portion 272 connected to the lever body 271.

Figure 29B:
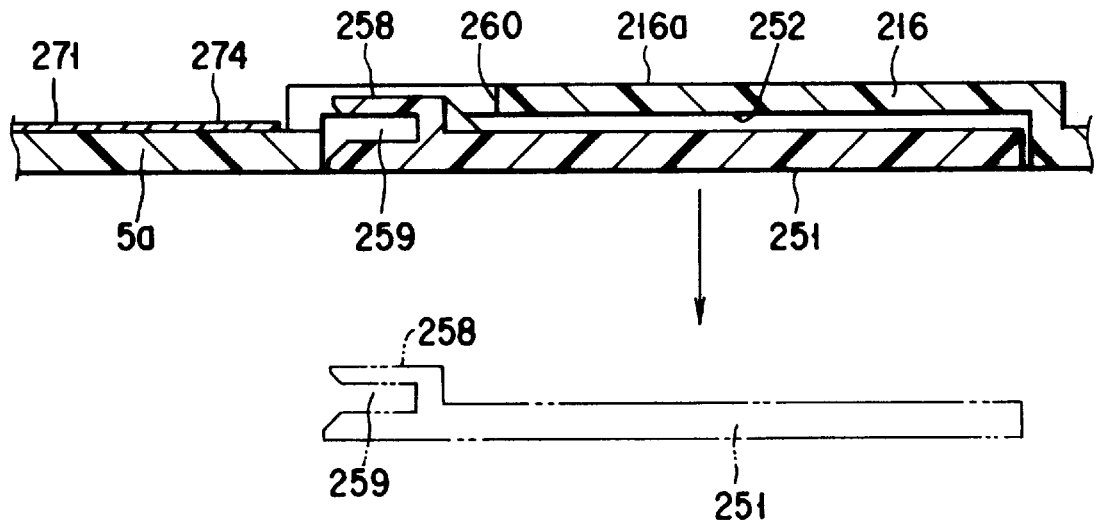
FIG. 29B is a cross-section where the locking of the operation lever of the ejector is released.

The bottom wall 5a has a shaft portion 273. An end of the lever body 271 is rotatably pivoted on the bottom wall 5a by the shaft portion 273. The other end of the lever body 271 is introduced to the vicinity of the opening portion 260, penetrating through around the insertion guide 216. A stopper nail portion 274 is formed on the other end portion of the lever body 271. The stopper nail portion 274 enters into the engaging groove 259 of the operation lever 251 and is hooked on the stopper wall 258, when the operation lever 251 is held at the first position. Therefore, the lever body 271 is supported on the bottom wall 5a such that the lever body 271 can be rotated between a first position as shown in FIGS. 24 and 29A where the stopper nail portion 274 enters into the engaging groove 259 and a second position as shown in FIGS. 25 and 29B where the stopper nail portion 274 is released off from the engaging groove 259.

As shown in FIG. 25, the arm portion 272 of the link lever 270 extends from the vicinity of the shaft portion 273 as the rotation center of the lever body 271 toward the slider 246. The top end of the arm portion 272 is rotatably connected with the slider 246, thereby linking the slider 246 with the lever body 271. Therefore, when the slider 246 is moved to the locked position, the lever body 271 is rotated to the first position. When the slider 246 is slided to the lock-released position, the lever body 271 is rotated to the second position. As a result of this, the rotation of the operation lever 251 to the second position is restricted when the CD-ROM drive device 218 or the floppy disc drive device 219 is kept locked in the second pack receptacle 210.

Note that the reference 280 in FIGS. 1 and 21 denotes an AC power source adapter which converts a commercial alternating current power source into a direct current power source. This adapter 280 is provided above the connector support portion 34a of the first circuit board 34, and is contained in the convex portion 22 of the upper housing 6.

In the first embodiment of the present invention as described above, the procedures for detaching the battery pack 135 from the casing 4 will be explained.

At first, the casing 2 is lifted up, to make the bottom wall 5a of the casing 2 off from, for example, a top board of a desk. In this state, the holding member 185 is pushed up to the second position by the operation lever 188. Then, the locking claw 186 of the holding member 185 leaves the second side wall 173 of the battery cover 170, thereby releasing the locking of the battery cover 170.

Next, the battery cover 170 is slided toward the right side, with the holding member 185 kept pushed up to the second position. By thus sliding the battery cover 170, the second engaging parts 172a and 172b as well as the third engaging parts 174a and 174b of the battery cover 170 are released from the engaging projections 176a and 176b as well as the engaging projections 177a and 177b, and simultaneously, the fourth engaging parts 173a and 173b of the battery cover 170 are released from the stopper nails 178a and 178b. As a result of this, the battery cover 170 is detached from the lower housing 5, and the battery pack 135 contained in the battery container room 104 and the locking member 150 are exposed to the outside of the casing 2.

In the next, a finger is hooked on the stopper claw 155 at the top end of the locking member 150, to rotate the locking member 150 to the lock-released position. By thus rotating the locking member 150, the stopper claw 155 of the locking member 150 is released off from the corner portion 136a of the battery case 136, and the locking of the battery pack 135 is released. Then, since the second end of the battery case 136 having the corner portion 136a is continuously pressed against the opening portion 100a by the compression coil springs 164a and 164b, the second end of the battery case 136 is forcibly pushed out of the battery container room 104. Therefore, the battery pack 135 is rotated around a fulcrum of a contact position between the battery connector 108 and the terminal plates 138, so that the second end jumps out of the opening portion 100a. As a result of this, an operator can easily catch the second end of the battery case 136 by hands, so that even a heavy battery pack 135 can be easily pulled out of the battery container room 104.

When the battery pack 135 is detached with the computer 1 set up side down and with the bottom wall 5a oriented upwardly, as particularly shown in FIGS. 2 and 14, the second end of the battery case 136 jumps upwardly out of the opening portion 100a, so that the second end of the battery case 136 can be easily caught by hands. Therefore, it is not necessary to make a troublesome operation, i.e., to pull out a heavy battery pack 135 from inside the battery container room 104. The battery pack 135 can be easily detached.

In addition, since the battery pack 135 can be rotated around a fulcrum of a contact portion between the battery connector 108 and the terminal plates 138, the connection terminals 109 of the battery connector 108 does not rub the terminal plates 138, and an excessive force which would act to bend the connection terminals 109 is not applied. Therefore, damages on the battery connector 108 can be prevented.

According to the structure as described above, the locking member 150 is hooked on the battery pack 135, and the battery pack 135 is maintained in the battery container room 104, when the battery cover 170 is kept detached from the casing 2. Therefore, even though the battery container room 104 is open in the bottom wall 5a of the lower housing 5, the battery pack 135 can be prevented from unintentionally falling. In this case, since the locking member 150 is adjacent to the battery pack 135, the battery pack 135 can be supported by the hand which is simultaneously used for operating the locking member 150. Therefore, when the locking member 150 is moved to the lock-released position thereby releasing the locking of the battery pack 135, the battery pack 135 is prevented from unintentionally falling, so that the procedures for detaching the battery pack 135 from the casing 2 are facilitated.

In addition, when the battery cover 170 is kept attached to the casing 2, the cover body 171 of the battery cover 170 is in contact with the bottom surface of the battery case 136, and therefore, the battery pack 135 can be supported from the lower side thereof, with use of the battery cover 170. Therefore, a heavy battery pack 135 can be securely held in the battery container room 104 by the locking member 150 and the battery cover 170.

The battery cover 170 covers and hides the locking member 150. Therefore, as long as the battery cover 170 is not detached, the locking of the battery pack 135 cannot be released. It is thus possible to prevent the locking of the battery pack 135 from being unintentionally released.

In the computer 1 as described above, the hard-disc drive device 118 is detached from the hard-disc container room 103, in the following procedures. At first, as shown in FIG. 2, the computer 1 is set up side down, and the battery cover 170 and the battery pack 135 are detached from the battery container room 104. Then, the battery container room 104 is opened, so that the hard-disc drive device 118 is be exposed to the outside of the casing 2 through the battery container room 104 and the opening portion 100a of the lower housing 5.

In the next, the screws 127 are screwed out, to release the connection between the hard-disc drive device 118 and the guide wall 115. Then, a finger is inserted through the opening portion 100a and the battery container room 104, and the finger is hooked on the stopper portion 125 of the hard-disc drive device 118, to slide the hard-disc drive device 118 in the direction in which the device 118 is moved away from the hard disc connector 105. By thus sliding the device 118, the engagement between the hard-disc connector 105 and the relay connector 120 is released, so that the hard-disc drive device 118 can be pulled out of the hard-disc container room 103.

In this case, the hard-disc container room 103 and the battery container room 104 are disposed in the thickness direction of the casing 2, and therefore, the hard-disc drive device 118 can be taken out through the battery container room 104 and the opening portion 100a of the lower housing 5, or inversely, the hard-disc drive device 118 can be inserted into the hard-disc container room 103. Therefore, it is not necessary to form an opening portion specialized for inserting and taking out the hard-disc drive device 118, and thus, the structure of the casing 2 can be simplified.

When the hard-disc drive device 118 is kept contained in the hard-disc container room 103, the hard-disc drive device 118 is covered by the battery pack 135 from below. Therefore, any special cover for covering the hard-disc drive device 118 is not required, and accordingly, the number of components used can be reduced.

In addition, according to the computer 1 described above, the first pack receptacle 100 contains the hard-disc drive device 118 and the battery pack 135, layered in the thickness direction of the casing 2. Therefore, the battery cover 170 need only have a size large enough to cover the battery pack 135 which is larger than the hard-disc drive device 118. Therefore, the battery cover 170 can be formed in a compact size, and detaching and attaching services for the battery cover 170 can be carried out with ease.

Further, according to the computer 1 having the structure as described above, the flat space occupied by the hard-disc drive device 118 and the battery pack 135 can be reduced in comparison with a case in which the hard-disc drive device 118 and the battery pack 135 are disposed in the width direction of the casing 2. Therefore, it is possible to save a space for containing the functional components such as the CD-ROM drive device 218 and the floppy disc drive device 219, inside the casing 2, without enlarging the flat shape of the casing 2 to be large. The internal equipment efficiency of the casing 2 can thus be improved.

Meanwhile, supposing that the floppy disc drive device 219 is attached to the second pack receptacle 210 in the computer 1 having the structure as described above, the procedures for replacing the floppy disc drive device 219 with the CD-ROM drive device 218 will be explained below.

At first, the computer 1 is lifted or set up side down, to expose the operation lever 248 in the bottom wall 5a of the casing 2. In the next, the operation lever 248 is operated to slide the slider 246 from the locked position to the lock-released position. By thus sliding the slider 246, the engaging projection 247 is pulled out of the locking groove 229 of the floppy disc drive device 219, and the locking of the floppy disc drive device 219 is released. Since this slider 246 is moved, linked with the lever body 271 of the link lever 270, the lever body 271 is rotated from the first position to the second position when the slider 246 is slided to the lock-released position. Therefore, the stopper nail portion 274 leaves the engaging groove 259 of the operation lever 251, thereby releasing the locking of the operation lever 251.

In the next, a finger is inserted into the escape portion 257 of the bottom wall 5a of the lower housing 5, and the finger is hooked on the edge portion 251a of the operation lever 251. Then, the operation lever 251 is rotated from the first position to the second position. Then, as shown in FIG. 28A, the pressure parts 265a and 265b of the operation lever 251 press the connector mount surface 234a of the floppy disc drive device 219 in the direction in which the connector mount surface 234a is moved away from the relay connector 213. By thus pressing the parts 265a and 265b, the FDD connector 235 of the floppy disc drive device 219 leaves the relay connector 213, and the floppy disc drive device 219 is pushed out of the insertion port 212. At this time, since the connector mount surface 234a of the floppy disc drive device 219 is continuously pressed in the direction toward the insertion port 212 by the compression coil spring 266, this pressure force is added to the force applied by operating the operation lever 251. Therefore, when the engagement between the FDD connector 235 and the relay connector 213 is released, the floppy disc drive device 219 jumps out of the insertion port 212, in response to the pressure force from the the compression coil spring 266.

Hence, an operator can catch that portion of the floppy disc drive 219 by which this device 219 projects from the insertion port 212, so that the floppy disc drive device 219 can easily be pulled out of the second pack receptacle 210. When the floppy disc drive device 219 is completely detached, the operation lever 251 is rotated toward the first position, and is stored into the storage concave portion 252 of the bottom wall 5a.

In the next, the CD-ROM drive device 218 is inserted into the second pack receptacle 210 through the insertion port 212, and the CD-ROM connector 231 is engaged with the relay connector 213. Due to this engagement, the CD-ROM drive device 218 is electrically connected to the computer 1.

In the next, the operation lever 248 of the stopper 245 is operated to slide the slider 246 to the locked position from the lock-released position. By thus sliding the slider, the engaging projection 247 of the slider 246 is engaged in the locking groove 229 of the casing 220. In addition, the lever body 271 of the link lever 270 is rotated from the second position to the first position as the slider 246 slides. By this rotation, the engaging nail portion 274 enters into the engaging groove 259 of the operation lever 251, and the operation lever 251 is locked on the first position. As a result of this, the CD-ROM drive device 218 is locked in the second pack receptacle 210, and thereby, a series of procedures for replacing the CD-ROM drive device 218 with the floppy disc drive device 219 are completed.

If the slider 246 of the stopper 245 is slided from the lock-released position to the locked position before the CD-ROM drive device 218 is inserted into the second pack receptacle 210, the stopper wall 228 of the casing 220 interferes with the engaging projection 247 of the slider 246, when the CD-ROM drive device 218 is inserted into the second pack receptacle 210. In this case, the corner portions of the stopper wall 228 and the engaging projection 247, which face each other, respectively form slanting surfaces 228a and 247a. Therefore, when the slanting surface 228a of the stopper wall 228 is brought into contact with the slanting surface 247a of the engaging projection 247, the slider 246 is applied with a force by which the slider 246 is pushed in a direction from the locked position toward the lock-released position, and the slider 246 is forcibly pushed back to the lock-released position from the locked position. Therefore, the engaging projection 247 is moved away from the stopper wall 228, so that the insertion operation of the CD-ROM drive device 218 is not prevented even if the slider 246 is slided to the locked position when the CD-ROM drive device 218 is inserted into the second pack receptacle 210.

According to the computer 1 having the structure as described above, the operation lever 251 of the ejector 250 is provided at the bottom wall 5a of the lower housing 5, so that the casing 2 of the computer 1 covers and hides the operation lever 251, when the computer 1 is placed on a top board of a desk. Therefore, when the floppy disc drive device 219 or the CD-ROM drive device 218 is taken out of the second pack receptacle 210, it is necessary to make intentional operations of lifting up the casing 2 to make the bottom wall 5a off from the top board of the desk or of setting the casing 2 up side down to keep the computer 1 in a condition in which the operation lever 251 can be operated.

Therefore, it is possible to prevent erroneous operation that an operation lever 248 or 251 is operated while using the floppy disc drive device 219 or the CD-ROM drive device 218, and thus, operation of taking out the floppy disc drive device 219 and the CD-ROM drive device 218 from the second pack receptacle 210 can be securely carried out without errors.

In addition, since the operation lever 251 is provided at the bottom wall 5a of the casing 2, the operation lever 251 is positioned adjacent to the floppy disc drive device 219 or CD-ROM drive device 218 in the vertical direction in the casing 2. Therefore, the length from the pivot shaft 256 as a rotation center of the operation lever 251 to the edge portion 251a used for hooking a finger is set to be much longer than the length from the pivot shaft 256 to the contact portion between the pressure parts 265a and 265b and the connector mount surface 220a or 234a. Consequently, when the operation lever 251 is rotated from the first position toward the second position, the rotation force of the operation lever 251 is amplified by the ratio between the two lengths described above, and is transmitted to the connector mount surface 220a or 234a. As a result of this, the pressure force applied to the connector mount surface 220a or 234a through the pressure parts 265a and 265b is increased to be large enough to exceed the engagement force between the relay connector 213 and the FDD connector 235 or the CD-ROM connector 231. Therefore, when the floppy disc drive device 219 or the CD-ROM drive device 218 is pushed out of the second pack receptacle 210, the operation lever 251 can be easily operated with a small force, so that the floppy disc drive device 219 or the CD-ROM drive device 218 can be easily detached.

In addition, according to the structure as described above, the pressure parts 265a and 265b of the operation lever 251 are arranged adjacent to the relay connector 213, and also presses the connector mount surface 220a or 234a at two positions which are arranged apart from each other in the lengthwise direction of the relay connector 213. Therefore, the floppy disc drive device 219 or CD-ROM drive device 218 is linearly pushed out toward the insertion port 212 without being leaned. Accordingly, any unreasonable force which would wrench the engagement portion between the relay connector 213 and the FDD connector 235 or CD-ROM connector 231 is not applied thereto. As a result of this, damages on the connectors 214, 235, and 231 can be prevented, and the floppy disc drive device 219 or the CD-ROM drive device 218 can be smoothly pushed out.

Further, according to the structure as described above, when the engaging projection 247 of the stopper 245 is kept engaged in the locking groove 229 of the floppy disc drive device 219 or the CD-ROM drive device 218, the stopper nail portion 274 is hooked on the operation lever 251 of the ejector 250, thereby locking the operation lever 251 on the first position. Therefore, even if an operator should erroneously try to rotate the operation lever 251 from the first position to the second position while the floppy disc drive device 219 or the CD-ROM drive device 218 is locked in the second pack receptacle 210, the stopper nail portion 274 prevents the rotation lever 251 from being rotated. Hence, an operator will find that the floppy disc drive device 219 or the CD-ROM drive device 218 is locked in the second pack receptacle 210, and thus, it is possible to prevent erroneous operation of forcibly pushing out the floppy disc drive device 219 or the CD-ROM drive device 218 from the second pack receptacle 210. Therefore, damages on the ejector 250 and the stopper 245 can be prevented.

Note that the present invention is not limited to the first embodiment described above. FIG. 30 shows a second embodiment of the present invention. This second embodiment is different from the first embodiment mainly in the structure of a battery pack and the structure for locking the battery pack in a battery container room, and the other points concerning the structure of the second embodiment are the same as those of the first embodiment. Therefore, those portions of the second embodiment which are the same as those of the first embodiment will be denoted at the same reference symbols, and explanation of those portions will be omitted herefrom.

As shown in FIG. 30, the battery case 136 of the battery pack 135 integrally compresses a cover portion 300 for opening and closing the operating portion 100a of the lower housing 5. The cover portion 300 is arranged such that the cover portion 300 is detachably hooked on the lower housing 5 when slided together with the battery pack 135 toward the battery connector 108. This cover portion 300 is held in the lower housing 5 by the holding member 185. Therefore, the battery pack 135 is also held in the battery container room 104 by the holding member 185, and this holding member 185 serves to lock the battery pack 135.

According to the second embodiment having the structure as described above, since the battery pack 135 and the cover portion 300 are locked in the lower housing 5 by on single holding member 185, any special mechanism for locking the battery pack 135 is not required. Therefore, the number of components can be reduced, and the manufacturing costs for the computer 1 can also be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic apparatus comprising:
   a casing having a pack receptacle comprising a first end having a battery connector, a second end facing the first end, and an opening portion communicating with the first and second ends;
   a battery pack stored in said pack receptacle, capable of being removed therefrom through the opening portion, and comprising a first end and a second end opposing the first end, said first end having terminal plates which contact said battery connector;
   a locking means positioned in the second end of the pack receptacle for holding the battery pack in the pack receptacle, said locking means being movable by manual operation between a locked position where the locking means is hooked on the second end of the battery pack and a lock-released position where the locking means leaves the second end of the battery pack; and
   pressure means provided in the second end of the pack receptacle for energizing the second end of the battery pack towards the opening portion, and for allowing the second end of the battery pack to incline so as to protrude outside the opening portion when said lock means is moved to the lock-released position.

2. An electronic apparatus according to claim 1, further comprising a cover detachably supported on the casing for covering the opening portion and the locking means.

3. An electronic apparatus according to claim 2, wherein said locking means has a locking member supported by the second end of the pack receptacle, comprising a claw detachably engaged with the second end of the battery pack and held at the locking position by a spring member.

4. An electronic apparatus according to claim 3, wherein said casing has a holding member for holding the cover on the casing, said holding member being movable by manual operation between a first position where the holding member is engaged with the cover and a second position where the holding member leaves the cover.

5. An electronic apparatus according to claim 4, wherein said spring member has a first pressure part which pushes the locking member toward the locking position and a second pressure part which pushes the holding member toward the first position.

6. An electronic apparatus according to claim 1, wherein the pressure means has a plurality of springs supported on the second end of the pack receptacle and a pressure plate supported on end portions of the springs, so as to bridge the end portions, wherein the pressure plate is in contact with the second end of the battery pack.

7. An electronic apparatus comprising:
   a casing including a pack receptacle having an end portion and an opening portion communicating with the end portion, and a wall opposed to the opening portion;
   a packaged functional component stored in said pack receptacle and capable of being removed therefrom through the opening portion, and having an end portion facing the wall of the pack receptacle;
   locking means positioned in the pack receptacle for holding the functional component in the pack receptacle, said locking means being movable by manual operation between a locked position where the locking means is hooked on the end portion of the functional component and a lock-released position where the locking means leaves the end portion of the functional component; and
   pressure means provided in the pack receptacle for pressing the end portion of the functional component towards the opening portion and for slanting said functional component within said pack receptacle by exerting pressure when said locking means is moved to the lock-released position, said pressure means having a plurality of springs supported on the wall and located apart from each other and a pressure plate supported on the end portions of the springs so as to bridle the end portions, said pressure plate being in contact with the end portion of the functional component, thereby pushing the end portion of the functional component outside the opening portion.

8. An electronic apparatus comprising:

a casing having a peripheral wall;

a pack receptacle defined within the casing, said pack receptacle having an opening portion open in the peripheral wall;

a packaged functional component stored in the pack receptacle such that the packaged functional component can be detached through the opening portion;

locking means positioned in the opening portion of the pack receptacle for holding the functional component in the pack receptacle, said locking means being movable by manual operation between a locked position where the locking means is hooked on the functional component and a lock-released position where the locking means leaves the functional component;

pressure means provided in the pack receptacle for pressing the packaged functional component towards the opening portion and for slanting said functional component within said pack receptacle when said locking means is moved to the lock-released position, thereby pushing a portion of the functional component outside the opening portion;

energizing means for continuously energizing the locking means toward the locking position;

a cover detachably supported on the casing for covering the opening portion and the locking means;

wherein the pack receptacle has a first connector, wherein the functional component has a first end provided with a second connector which is connected with the first connector when the functional component is stored in the pack receptacle and a second end positioned opposite to the first end on which the locking means is hooked, and wherein the pressure means is provided at a position corresponding to the second end; and wherein the pack receptacle has a wall facing the second end of the functional component, and wherein the pressure means has a plurality of springs supported on the wall and a pressure plate supported on end portions of the springs so as to bridge the end portions, wherein the pressure plate is in contact with the second end of the functional component.

9. An electronic apparatus comprising:

a casing having a peripheral wall;

a pack receptacle defined within the casing, said pack receptacle having an opening portion open in the peripheral wall;

a packaged functional component stored in the pack receptacle such that the packaged functional component can be detached through the opening portion;

locking means positioned in the opening portion of the pack receptacle for holding the functional component in the pack receptacle, said locking means being movable by manual operation between a locked position where the locking means is hooked on the functional component and a lock-released position where the locking means leaves the functional component;

pressure means provided in the pack receptacle for pressing the packaged functional component towards the opening portion and for slanting said functional component within said pack receptacle when said locking means is moved to the lock-released position, thereby pushing a portion of the functional component outside the opening portion;

energizing means for continuously energizing the locking means toward the locking position;

a cover detachably supported on the casing for covering the opening portion and the locking means;

wherein the pack receptacle has a first connector, wherein the functional component has a first end provided with a second connector which is connected with the first connector when the functional component is stored in the pack receptacle and a second end positioned opposite to the first end on which the locking means is hooked, and wherein the pressure means is provided at a position corresponding to the second end;

wherein the pack receptacle has an inner wall facing the first connector, wherein the first connector has a plurality of contact elements which are elastically deformed to have contact with the second connector, and wherein the contact elements press the functional component toward the inner wall; and wherein the locking means has a locking member supported on the inner wall, wherein the locking member has a claw which can be engaged with the second end of the functional component, and wherein the claw is exposed to the opening portion when the cover is detached from the casing.

10. An electronic apparatus comprising:

a casing having a peripheral wall;

a pack receptacle defined within the casing, said pack receptacle having an opening portion open in the peripheral wall;

a packaged functional component stored in the pack receptacle such that the packaged functional component can be detached through the opening portion;

locking means positioned in the opening portion of the pack receptacle for holding the functional component in the pack receptacle, said locking means being movable by manual operation between a locked position where the locking means is hooked on the functional component and a lock-released position where the locking means leaves the functional component;

pressure means provided in the pack receptacle for pressing the packaged functional component towards the opening portion and for slanting said functional component within said pack receptacle when said locking means is moved to the lock-released position, thereby pushing a portion of the functional component outside the opening portion;

energizing means for continuously energizing the locking means toward the locking position;

a cover detachably supported on the casing for covering the opening portion and the locking means;

wherein the pack receptacle has a first connector, wherein the functional component has a first end provided with a second connector which is connected with the first connector when the functional component is stored in the pack receptacle and a second end positioned opposite to the first end on which the locking means is hooked, and wherein the pressure means is provided at a position corresponding to the second end; and wherein the functional component is a battery pack having a case to be engaged in the pack receptacle, and further comprising a plurality of secondary batteries contained in the case.

* * * * *